US012541984B2

(12) United States Patent
Alakarhu

(10) Patent No.: US 12,541,984 B2
(45) Date of Patent: Feb. 3, 2026

(54) DETECTING CHANGE IN QUALITY AND OTHER OBSTRUCTIONS IN LICENSE PLATE RECOGNITION SYSTEMS

(71) Applicant: Axon Enterprise, Inc., Scottsdale, AZ (US)

(72) Inventor: Juha Alakarhu, Tampere (FI)

(73) Assignee: Axon Enterprise, Inc., Scottsdale, AZ (US)

( * ) Notice: Subject to any disclaimer, the term of this patent is extended or adjusted under 35 U.S.C. 154(b) by 480 days.

(21) Appl. No.: 17/887,124

(22) Filed: Aug. 12, 2022

(65) Prior Publication Data

US 2023/0049184 A1 Feb. 16, 2023

Related U.S. Application Data

(60) Provisional application No. 63/232,815, filed on Aug. 13, 2021.

(51) Int. Cl.
*G06V 30/12* (2022.01)
*B60S 1/04* (2006.01)
(Continued)

(52) U.S. Cl.
CPC .............. *G06V 30/133* (2022.01); *B60S 1/04* (2013.01); *B60S 1/56* (2013.01); *G06V 20/625* (2022.01); *G06V 30/1916* (2022.01)

(58) Field of Classification Search
CPC .............. G06V 30/133; G06V 20/625; G06V 30/1916; B60S 1/04; B60S 1/56
See application file for complete search history.

(56) References Cited

U.S. PATENT DOCUMENTS

2004/0153225 A1* 8/2004 Stam ...................... B60Q 1/143
702/127
2014/0007909 A1* 1/2014 Manaois ............ G02B 27/0006
134/18
(Continued)

FOREIGN PATENT DOCUMENTS

JP 2006235921 A * 9/2006
JP 2006235921 * 9/2008 ............... G06K 9/00
(Continued)

OTHER PUBLICATIONS

Zou et al, ("A Robust license Plate Recognition Model Based on Bi-LSTM", Digital Object Identifier, vol. 8, 2020, IEEE) (Year: 2020).*
(Continued)

*Primary Examiner* — Amara Abdi
(74) *Attorney, Agent, or Firm* — H S. Malvich, Jr.; Carmel Zhao

(57) ABSTRACT

License plate recognition ("LPR") systems may encounter degradation in quality and obstructions that negatively impact performance of the LPR systems. A LPR system is configured to apply image processing algorithms to output information describing performance of the system and to monitor the performance of the system over time. Based on the performance of the system over time, the LPR system determines when one or more entities of the system require action to maintain or improve performance and transmits information describing the required action.

20 Claims, 13 Drawing Sheets

(51) Int. Cl.
    *B60S 1/56*     (2006.01)
    *G06V 20/62*     (2022.01)
    *G06V 30/19*     (2022.01)

(56) References Cited

U.S. PATENT DOCUMENTS

| | | | |
|---|---|---|---|
| 2016/0110999 A1* | 4/2016 | Bulan | G06V 20/62 348/149 |
| 2016/0165101 A1* | 6/2016 | Akiyama | H04N 23/81 348/187 |
| 2017/0140227 A1* | 5/2017 | Takemura | G08G 1/165 |
| 2018/0082142 A1* | 3/2018 | Han | H04N 5/77 |
| 2018/0141521 A1* | 5/2018 | Irie | H04N 17/002 |
| 2019/0057315 A1* | 2/2019 | Yi | G06V 20/52 |
| 2020/0139936 A1* | 5/2020 | Yamauchi | B60S 1/36 |
| 2021/0224976 A1* | 7/2021 | Yonezawa | G06T 7/0008 |
| 2022/0262102 A1* | 8/2022 | Shin | G06V 20/62 |

FOREIGN PATENT DOCUMENTS

| | | | | |
|---|---|---|---|---|
| JP | 2012106557 A | * | 6/2012 | |
| JP | 2019153932 A | * | 9/2019 | |
| KR | 101553589 | * | 9/2015 | G06V 10/10 |

OTHER PUBLICATIONS

Sathya et al, ("Vehicle License Plate Recognition (VLPR)", 2017 IEEE, pp. 1-6) (Year: 2017).*

* cited by examiner

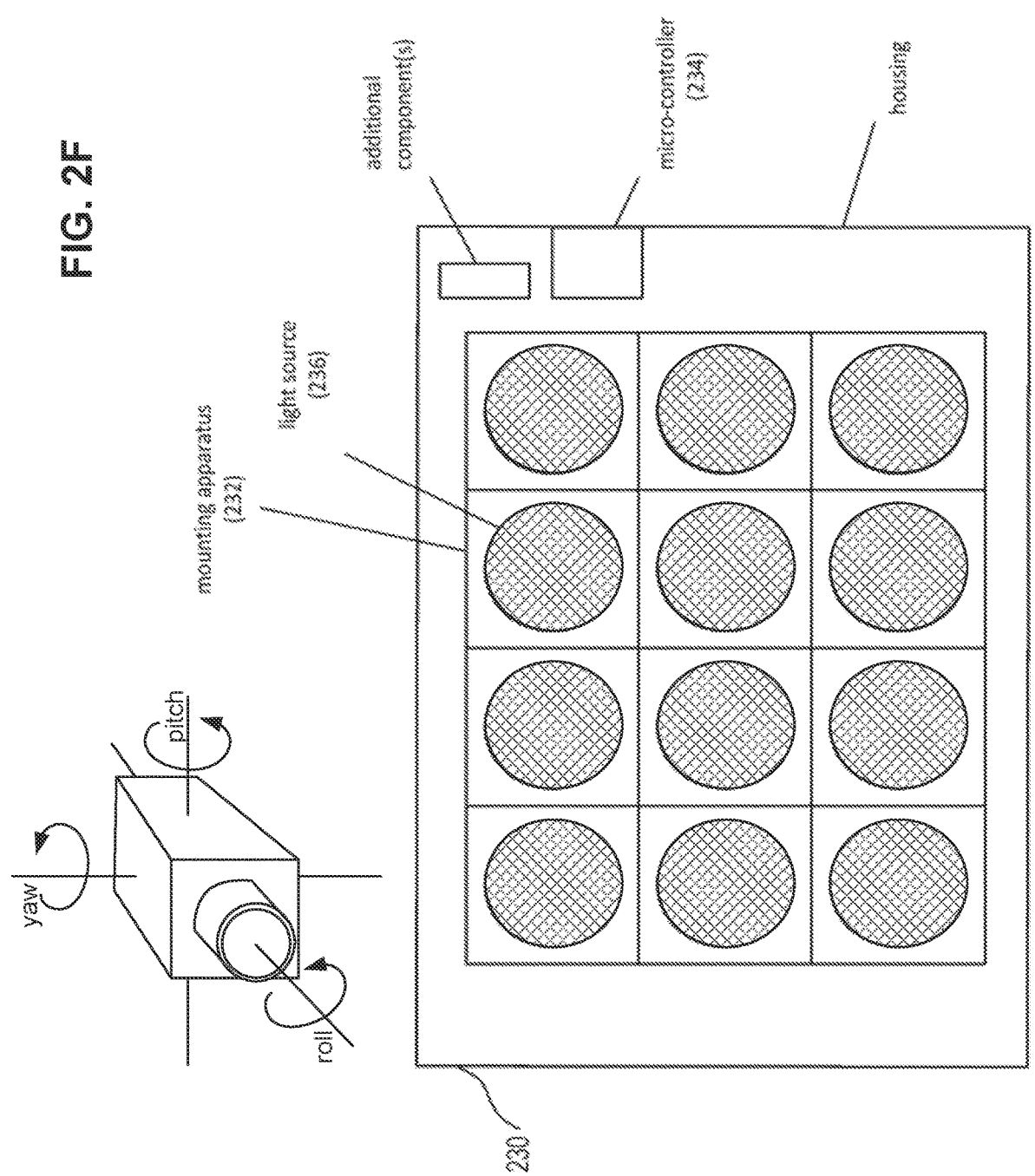

DETECTING CHANGE IN QUALITY AND OTHER OBSTRUCTIONS IN LICENSE PLATE RECOGNITION SYSTEMS

CROSS-REFERENCE TO RELATED APPLICATIONS

This application claims the benefit of U.S. Provisional Application 63/232,815, filed Aug. 13, 2021, which is incorporated by reference herein in its entirety.

FIELD OF THE INVENTION

Embodiments of the present invention relate to a license plate recognition ("LPR") system.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIG. 2F is an illustrative light emitting apparatus in accordance with one or more example embodiments.

Figure 1:
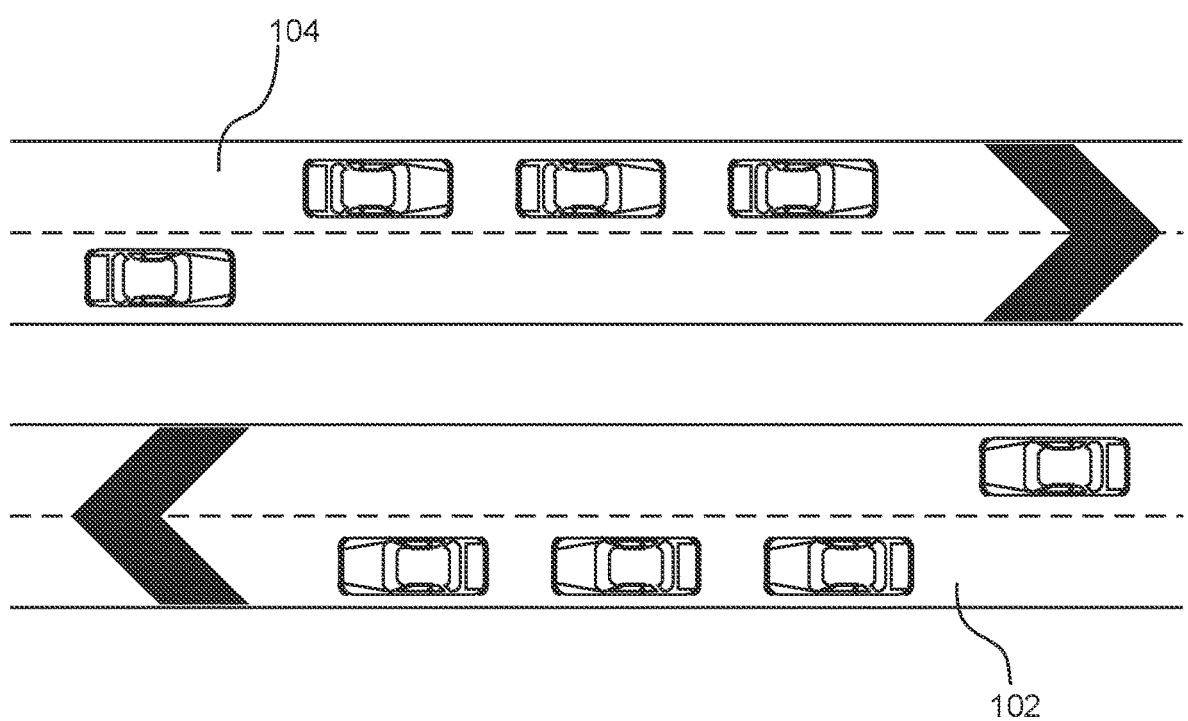
FIG. 1 shows an illustrative roadway on which subject vehicles and target vehicles may be traveling while the subject vehicle is operating in accordance with one or more example embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Generally, systems and methods are disclosed for capturing license plate information of a vehicle in relative motion to a camera device. In one example, the camera device captures an image of the vehicle's license plate across multiple frames. The camera system detects the license plate in the multiple frames, then aligns and geometrically rectifies the image of the license plate by scaling, warping, rotating, and/or performing other functions on the images of the license plate. The camera system optimizes the capturing of the license plate information by executing a temporal noise filter (e.g., temporal noise reduction—TNR) on the aligned, geometrically rectified images to generate a composite image of the license plate for optical character recognition. In some examples, the camera device may include a high dynamic range (HDR) sensor that has been modified to set the long exposure and short exposure of the HDR sensor to capture an image of a vehicle's license plate, but without the HDR sensor consolidating the images into a composite image. The camera system may set optimal exposure settings based on detected relative speed of the vehicle or other criteria.

By way of example, and in no way limiting the features and contemplated combination of features disclosed herein, four illustrative use cases are described below describing particular aspects of disclosed features. In addition to the four use cases listed below, the disclosure contemplates many other examples, embodiments, implementations, and use cases that use combinations of the features and aspects described in the individual use cases. For example, one or more use cases describe a camera device positioned in/on the camera car and that is communicatively coupled to a processor in an automatic license place reading (ALPR) system by a wired connection and/or a wireless connection. The terms ALPR and LPR are used interchangeably in this disclosure. The use cases may also operate in an environment where the camera device is physically apart from the processor and is communicatively coupled to the processor with one of a wired and wireless connection. For example, in one example the camera device attached to the police vehicle includes a plurality of cameras arranged at different locations of the police vehicle and configured to operate in a coordinated manner to capture images of vehicle license plates or other items. Moreover, in some examples, at least one of the aforementioned plurality of cameras may include an unmanned aerial vehicle (UAV) equipped with video capture capabilities. The UAV may be mounted to the vehicle and may be automatically launched as appropriate by the LPR system upon occurrence of particular trigger events.

In addition, one or more embodiments include computerized methods, systems, devices, and apparatuses that capture images of one or more moving vehicles (i.e., a target vehicle) from another moving vehicle (i.e., subject vehicle). The disclosed system detects degradation in quality and obstructions that negatively impact performance of LPR systems. LPR systems experiencing degradation or obstructions may be unable to capture legible, usable photographic images, or may be unable to detect license plate information or other information captured in photographic images. By monitoring performance of the LPR system during operation, the disclosed system may perform actions to correct degradation or may transmit information describing required actions to correct degradation or obstructions to other entities of the LPR system. Aspects of the disclosed system improve over the art because, inter alia, it monitors performance of the LPR system and determines when the LPR system is affected by quality degradation or obstructions in an environment that negatively impact the ability of the LPR system to capture or process legible, usable photographic images.

Regarding FIG. 1, in practice, target vehicles (e.g., oncoming traffic) on a roadway 102 traveling in a direction opposite to a subject vehicle on the roadway 104 may be traveling at different speeds and be at different distances. Meanwhile, the continuous flow of new target vehicles on the roadway 102 (e.g., oncoming traffic and following traffic) adds complexity to image capture. The optimum value for camera settings for each scenario is a non-linear function which depends on the camera performance parameters and detection algorithms, and may provide images of sufficient quality to capture objects and license plate numbers. In scenarios such as FIG. 1, which corresponds to roadways in countries like Britain and India, the oncoming traffic is on the right-hand side lane; thus, the configuration set for the implementation would be reversed for those countries.

Figure 2A:
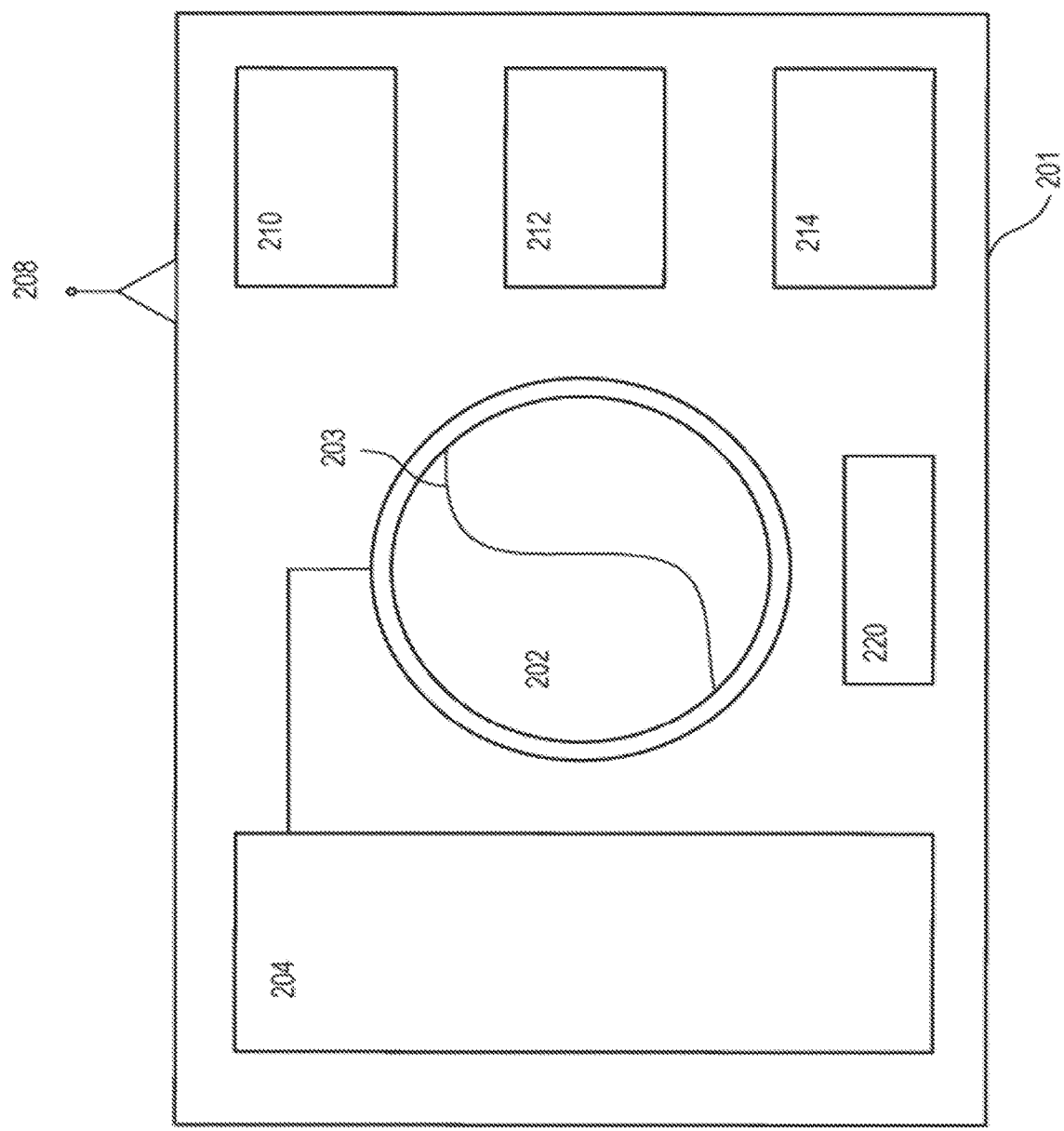
FIG. 2A shows illustrative camera apparatuses with several technical components in accordance with one or more examples embodiments.

FIG. 2A illustrates a camera apparatus enhanced with various aspects of the disclosed systems. The camera apparatus 201 may include one or more components to assist in enhancing image capture of a license plate of a moving, target vehicle. In particular, a micro-controller 204 may be incorporated with the camera apparatus 201 to automatically adjust settings. The micro-controller 204 may adjust settings such as, but not limited to, exposure time, (optionally) illumination power, focus position, sensor gain (camera ISO speed), aperture size, filters (e.g., ultraviolet—UV), image-noise filtering, and the like.

Elaborating with respect to asymmetric illumination to enhance license place recognition, the micro-controller 204 may receive inputs of speed delta and distance, and adjust the settings of exposure time and/or illumination power according to various scenarios.

In some examples, the camera apparatus 201 may be integrated with a light source 220 for emitting infrared light, or light in a different frequency spectrum. In alternate embodiments, a light emitting apparatus 230 may be physically separate from the camera apparatus 201. In such embodiments, the micro-controller 204 in the camera apparatus communicates with the micro-controller in the light emitting apparatus 230. For example, if the camera apparatus 201 is equipped with components to detect and measure the delta speed value and distance value of a target vehicle, then its micro-controller 204 may share this information with the light emitting apparatus 230 for efficiency. The apparatuses may share information wirelessly using antenna and wireless circuitry 208. The wireless circuitry 208 may support high-speed short-range communication to permit fast communication between the apparatuses. The wireless circuitry 208 may also include long-range communication hardware to permit connection to a remote server computer or cloud devices.

In addition to efficiency, the sharing of information between the devices furthers the synchronization of the apparatuses 201, 230 for purposes of capturing a higher quality image. For example, if the camera apparatus 201 relies on the light emitting apparatus 230 to provide a pulse of infrared light at the moment of, or just immediately prior to, the shutter 203 on the camera apparatus 201 opening, the two apparatus communicate and synchronize. In one example, to aid in synchronization, inter alia, the camera assembly may operate a pre-defined sequence of configuration settings at pre-defined intervals. The system may cycle through a set of scenarios to test the quality of image capture with each scenario. Meanwhile, multiple settings may be used without requiring the separate apparatus to synchronize each time—rather, the separate apparatus might synchronize just at the start of the pre-defined script. Once the script begins execution, each apparatus performs its part to completion.

Light source 220 (or light emitting apparatus 230) provides functionality to the overall system because it provides the illumination pattern for improving image capture quality. As such, the synchronization or alignment of the light emitting apparatus 230 and the camera apparatus 201 is important. In one example, an LED pulse and camera exposure time are aligned to capture numerous images with varying configuration settings. For example, first, the micro-controller 204 uses the most powerful LED pulse available and longer exposure time. This is good for catching target vehicles at longer distances (because a lot of light is needed and also the angular velocity is smaller so the longer exposure time is acceptable). Then on the next frame, the micro-controller 204 uses medium exposure time and illumination pulse power. This is useful for catching target vehicles at medium distances. Next, the micro-controller 204 may set a very short exposure time and also the lowest power LED pulse to catch the closest vehicles. Then the cycle may start again with the longest exposure time and highest pulse power. By adjusting both the exposure time and pulse power, the system is optimized for "inversely proportional to the square of the distance" characteristics of these systems. The illumination intensity is inversely proportional to the square of distance between the light source and target vehicle's license plate. This makes the exposure very difficult—if the target car is slightly too far away, the license plate may be too dark to see, and if the car is slightly too close, the license plate may be too bright to see (i.e., overexposed).

Referring to FIG. 2A, the camera apparatus 201 may also include memory 210, a global positioning system (GPS) unit 212, and a processor 214. The memory 210 is a suitable device configured to store data for access by a processor, controller, or other computer component. A memory stores information. A memory may provide previously stored information responsive to a request for information. A memory may store information in any conventional format. A memory may store electronic digital information. A memory may provide stored data as digital information. A memory includes any semiconductor, magnetic, optical technology, or combination thereof for storing information. A memory may receive information from a processing circuit for storage. A processing circuit may provide a memory a request for previously stored information. Responsive to the request the memory may provide stored information to a processing circuit. A memory may include any circuitry for storing program instructions and/or data. Storage may be organized in any conventional manner (e.g., program code, buffer, circular buffer). Memory may be incorporated in and/or accessible by a transmitter, a receiver, a transceiver, a sensor, a controller, and a processing circuit (e.g., processors, sequential logic). A memory may perform the functions of a data store and/or a computer-readable medium. The memory 210 may include non-volatile memory (e.g., flash memory), volatile memory (e.g. random-access memory—RAM), or a hybrid form of computer-readable medium for data storage. Moreover, the memory 210 may include one or more cache memories for high-speed access.

In various embodiments, processor 214 may comprise any circuitry, electrical components, electronic components, software, and/or the like configured to perform various operations and functions discussed herein. For example, processor 214 may comprise a processing circuit, a processor, a digital signal processor, a microcontroller, a microprocessor, an application-specific integrated circuit (ASIC), a programmable logic device, logic circuitry, state machines, micro-electromechanical system (MEMS) devices, signal conditioning circuitry, communication circuitry, a computer, a computer-based system, a radio, a network appliance, a data bus, an address bus, and/or any combination thereof. In various embodiments, processor 214 may include passive electronic devices (e.g., resistors, capacitors, inductors, etc.) and/or active electronic devices (e.g., op amps, comparators, analog-to-digital converters, digital-to-analog converters, programmable logic, sample rate converters (SRCs), transistors, etc.). In various embodiments, processor 214 may include data buses, output ports, input ports, timers, memory, arithmetic units, and/or the like.

In rapid operation, a camera apparatus 201 may capture multiple images in a matter of seconds. Multiple levels of cache memory may be used to ensure efficient execution. The memory 210 may closely operate with the processor 214. For example, the processor may include an image processor to analyze images captured by the apparatus 201 to determine if the image is sufficiently legible or insufficiently legible. The image processor may analyze images to determine whether to retain the image data, or immediately discard the image data. At least one benefit of an image processor operating nearly simultaneously with image capture is reduced memory usage due to immediate discarding of useless or empty images.

In one example of technological efficiencies of the system, the image captured by the image sensor 202 may be stored in memory 210 and then sent to processor 214 to detect the vehicle license plate number of the target vehicle in the image. The vehicle license plate number may then be compared against a database of license plate numbers (or other information) associated with possible legal-related issues. In some embodiments, the vehicle license plate number (and other information) may be sent over a network to a remote server in the cloud that stores a database of license plate numbers. If a concern is identified, the operator of the subject vehicle may be alerted audibly, visually, or through haptic feedback (e.g., vibrations).

In addition, the camera apparatus 201 may include a GPS unit 212 to capture the location of the camera apparatus 201 at the instant an image is captured. In addition to location, the GPS unit or other component in the camera apparatus may timestamp the capture of the image. Location and time data may then be embedded, or otherwise securely integrated, into the image (e.g., metadata of the image) to authenticate the capture of the photograph. Once the image is securely stamped with location and date/time, the image may, in some example, be securely transmitted to a cloud server for storage. In some examples, the image may be stored in an evidence management system provided as a cloud-based service.

In addition to location-stamping the image, the GPS unit 212 may also be used to enhance image capture. In one example, the speed of the subject vehicle may be obtained from the GPS unit 212 or from the on-board diagnostics (OBD) port of the subject vehicle. The vehicle speed and/or the positional data (e.g., longitude-latitude data) from the GPS unit 212, may allow the micro-controller to predict whether the subject vehicle is on a rural highway or other street. The speed of the subject vehicle effects the quality of the images captured because the angular velocity for close target vehicles will be too high. Therefore, the system becomes trained about which settings are optimal for the scenario. For example, the GPS unit 212 may detect if the subject vehicle is traveling in a city, suburb, or rural area, and adjust the settings in adherence.

In addition to location-stamping the image, the GPS unit 212 may also be used to enhance image capture. In one example, the system may remember particular configuration settings at a particular geographic location, and the micro-controller 304 may re-use the prior ideal configuration settings at that location. For example, a particular stretch of highway might have an impenetrable row of trees that renders the system futile for a duration of time. During that time, the system may halt image capture if the system is primarily being used in an ALPR application. Rather than collect image data and consume limited memory 210 on the camera apparatus 201, the system uses historical data to learn and improve the operation of the system with a feedback loop.

Figure 2B:
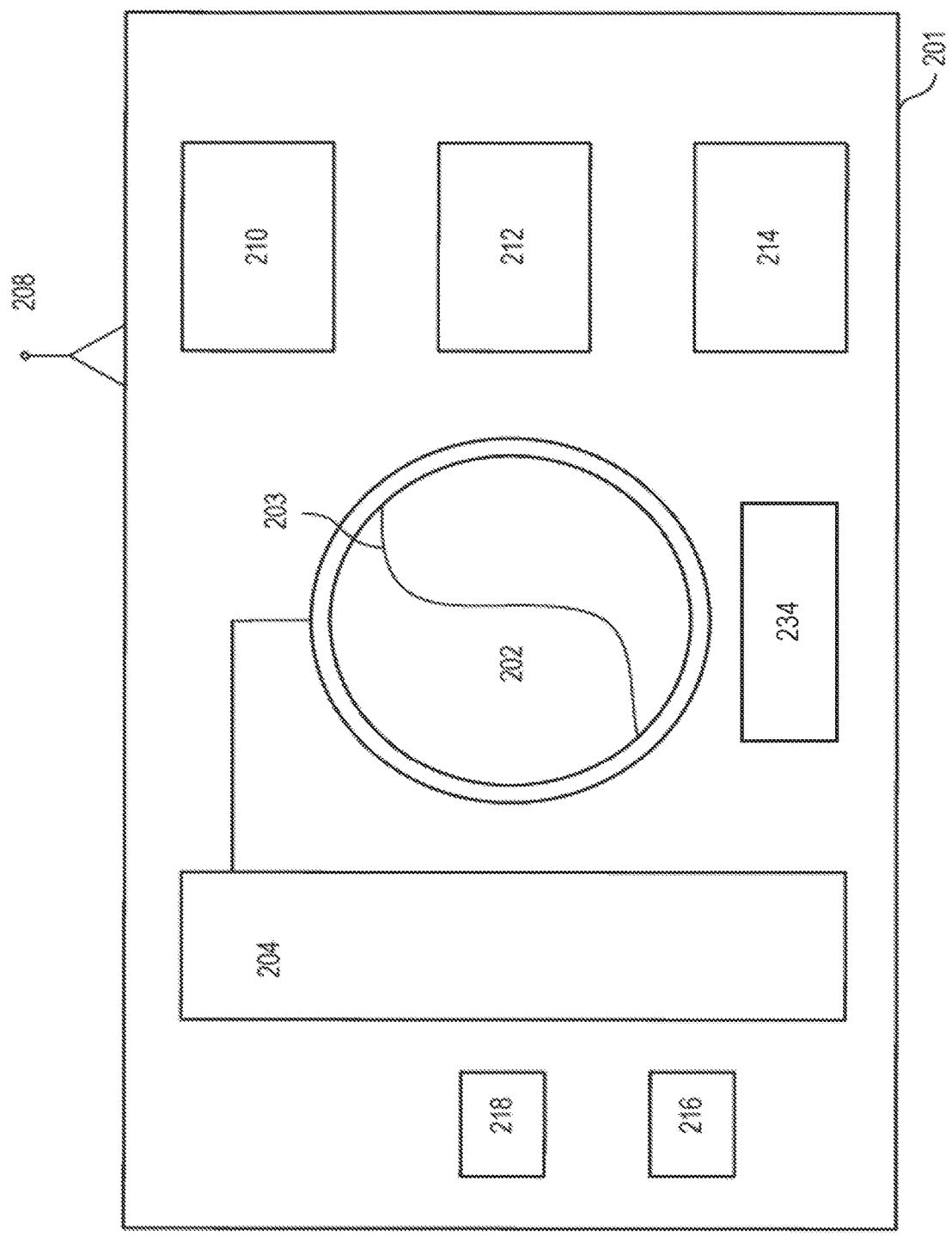
FIG. 2B shows illustrative camera apparatuses with several technical components in accordance with one or more examples embodiments.

Referring to FIG. 2B, the camera apparatus 201 may include and/or omit one or more components in some embodiments. For example, the light source 220 may be omitted in some embodiments of the camera apparatus 201. Instead, the light emitting apparatus may be external to the camera apparatus 201 and operate in a synchronized manner with the camera apparatus 201. Furthermore, the camera apparatus 201 may include additional components 218, such as a stabilizer, optical zoom hardware, cache memory, interface to a vehicle's on-board diagnostics (OBD) port, multi-axis accelerometer, a motion sensor, and components 216 configured to use artificial intelligence (AI) to perform operations. For example, an AI model may be trained and stored in memory on the camera apparatus 201 to assist the AI component 216 to use a feedback loop to adjust and refine its settings and operation. The AI component 216 may include a graphics processing unit (GPU) for processing machine learning and deep learning calculations with efficiency and speed.

A communication interface (e.g., communication circuit) transmits and/or receives information. A communication interface may transmit and/or receive (e.g., communicate) information via a wireless link and/or a wired connection. A communication interface may communicate using wireless (e.g., radio, light, sound, vibrations) and/or wired (e.g., electrical, optical) mediums. A communication interface may communicate using any conventional wireless (e.g., BLUETOOTH, ZIGBEE, WAP, WIFI, Near Field Communication, infrared, IrDA) and/or any conventional wired (e.g., USB, RS-232, Firewire, Ethernet, I2C) communication protocol. A communication interface may receive information from a processing circuit for transmission. A communication interface may provide received information to a processing circuit.

A communication interface in one electronic device may communicate with a communication interface in another electronic device. Communications between two devices may permit the two devices to cooperate in performing a function of either device. Information transferred between the devices may be encrypted (e.g., encoded, enciphered). The first device may comprise a detector. For example, the first device may comprise a processor of an LPR system configured to automatically detect a license plate in a captured image.

A communication interface enables a first electronic device to communicate with a second electronic device. The second electronic device may exchange information with the first electronic device. Information provided by the first electronic device may include telemetry data. The telemetry data may comprise one or more captured images, metadata respectively associated with one or more captured images, and/or information associated with performance of a LPR system comprising the first electronic device. Information provided to the detector may include information associated with performance of another LPR system comprising the second electronic device. The information associated with the performance of the other LPR system may comprise historic data generated during use of the other LPR system. In embodiments, the second electronic device may comprise the other LPR system or a remote computing device configured to receive and transmit information for a plurality of LPR systems including the LPR system and the other LPR system.

Communication interface 234 may perform the functions of a communication interface discussed above. Communication interface 234 may include one or more transceivers for wireless communication. Communication interface 234 may communicate with another electronic device of a same LPR system comprising camera apparatus 201 or an electronic device communicatively coupled to the LPR system comprising camera apparatus 201.

Furthermore, in a networked, crowdsourced arrangement, the camera assembly system may be installed on multiple, subject vehicles operating in a particular geographic area to provide broader coverage. The plurality of camera apparatuses on different vehicles may cooperate with each other by sharing information over a wireless connection. The camera apparatus in a first subject vehicle may be operated in conjunction with global satellites or other location tracking systems. A second subject vehicle with a camera assembly system may share information either directly with, or via a cloud server, the first subject vehicle. The sharing of information may allow the training of the AI component 216 with greater efficiency.

Although several of the examples with reference to FIGS. 2A and 2B have mentioned illumination with a light source 220, not all implementations of the camera apparatus (i.e., camera device) need to include such a component. For example, with respect to an LPR system that captures vehicle license plates using multi-exposure capture and/or temporal noise filtering (TNF), one or more of the components in the camera device 201 may be present, but not necessarily all components. For example, an LPR system may efficiently capture images in low lighting conditions without a light source 220 or light apparatus 230.

Figure 2C:
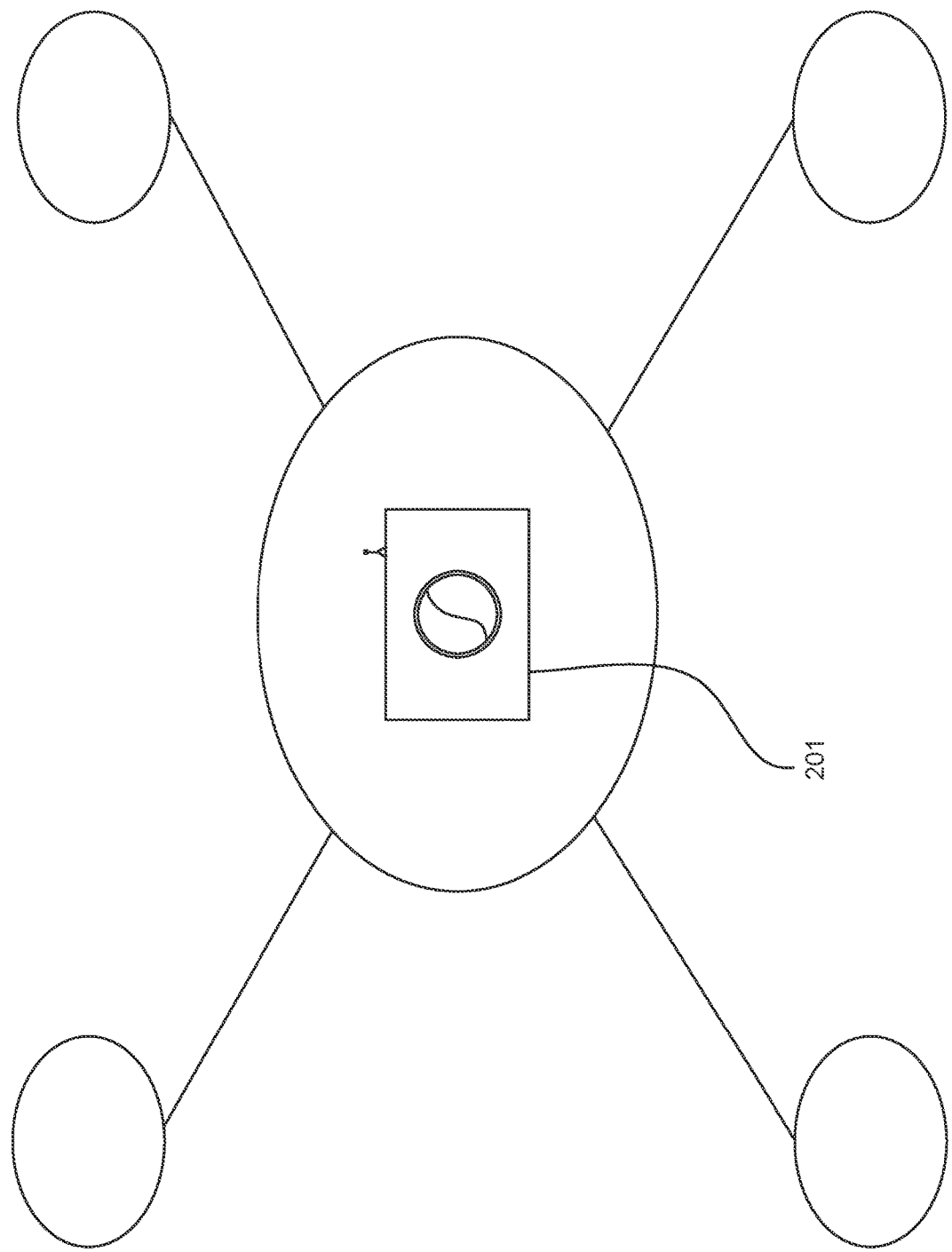
FIG. 2C is an example of implementations of the camera assembly in accordance with one or more example embodiments.

The system is not limited to traditional vehicles. Rather, unmanned aerial vehicles (UAVs) or drones are also considered vehicles for purposes of this disclosure. FIG. 2C illustrates a UAV equipped with the device 201. The installation of the device 201 on a UAV may rely upon components that were optional in a car installation. For example, GPS unit 212 (or comparable location tracking technology) may be critical to a device 201 installed on a UAV because of the UAVs ability to travel outside the confines of traditional lanes on a highway. Moreover, the UAV may optimize the illumination pattern from the device 201 to focus in a downward direction towards the road. The micro-controller 204 and AI component 216 in the device 201 may be used to train the system to optimize the capturing of license plate numbers of vehicles. Finally, in UAV installations, the operations of the camera apparatus 201 may be modified to account for any high-frequency vibrations that might occur from capturing images or video from a UAV. For example, a global shutter feature may be implemented in the camera apparatus 201 to reduce rolling shutter effect that might be caused by vibrations.

Figure 2D:
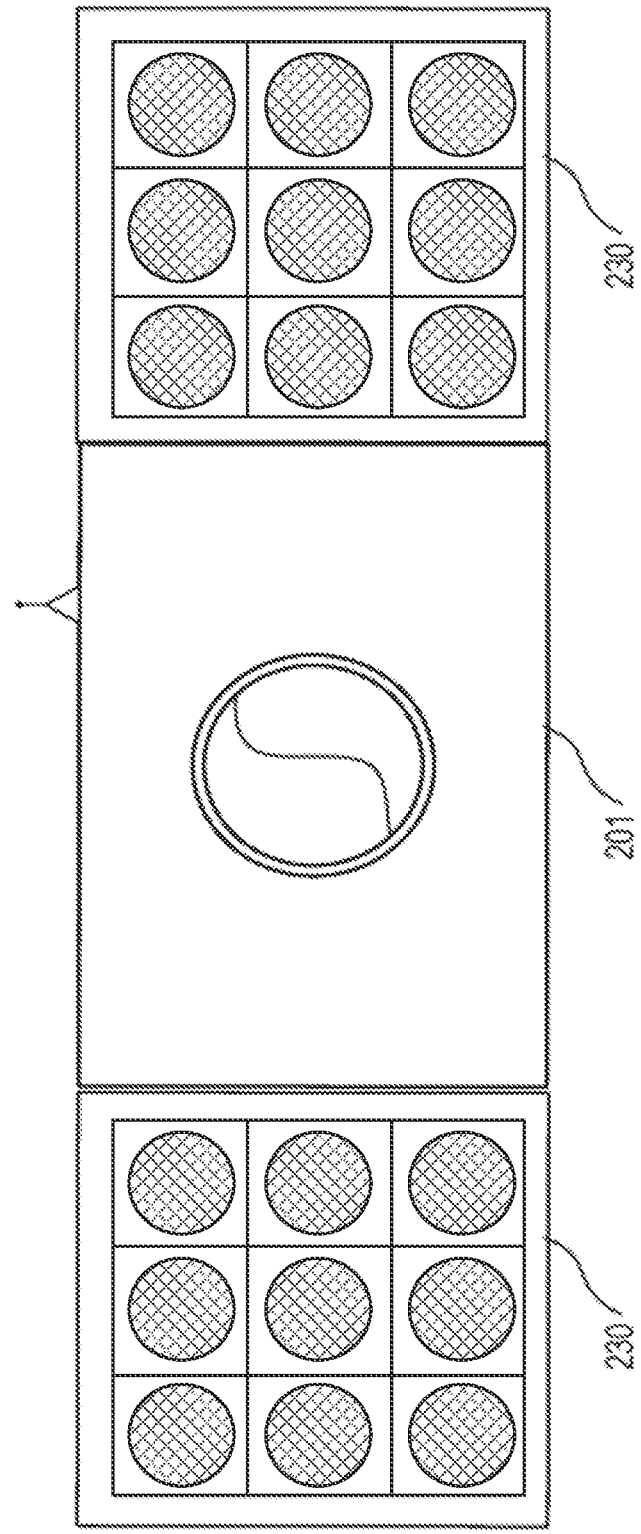
FIG. 2D is an illustrative light emitting apparatus in accordance with one or more example embodiments.
Figure 2E:
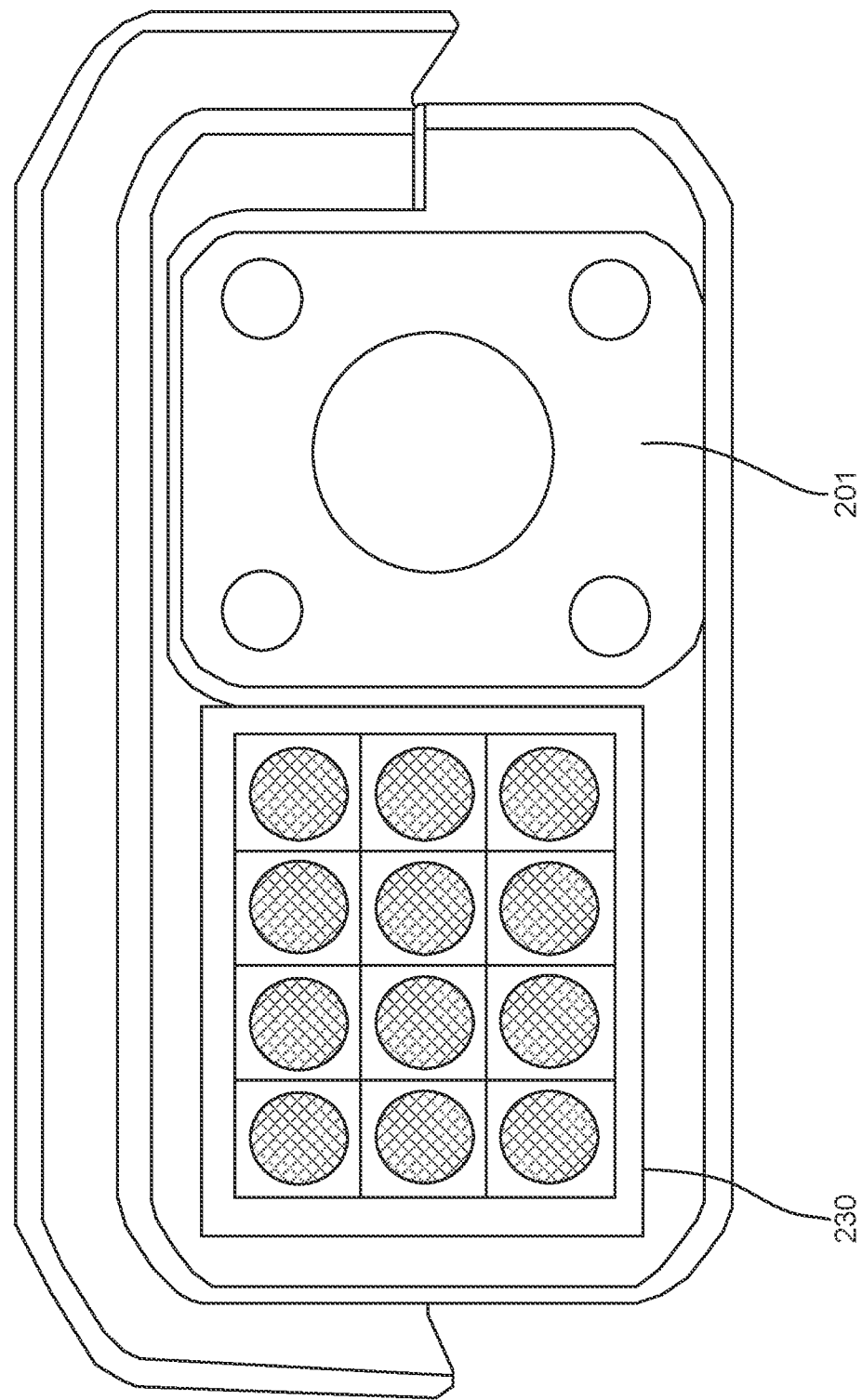
FIG. 2E is an illustrative light emitting apparatus in accordance with one or more example embodiments.

Referring to FIG. 2D and FIG. 2E, the illustrations are of embodiments of the system for commercial sale and use. Assembly 201 is a configuration of a camera apparatus 201 with a plurality of light emitting apparatuses 230. The assembly 201 may be mounted to the front of a police car to capture images for license plate recognition. The assembly 201 may draw power from the subject vehicle. Although FIG. 2D depicts the components of assembly 201 as a single object, in some examples, the parts of assembly 201 may be separated and installed separately or in an organized, different manner.

Figure 3:
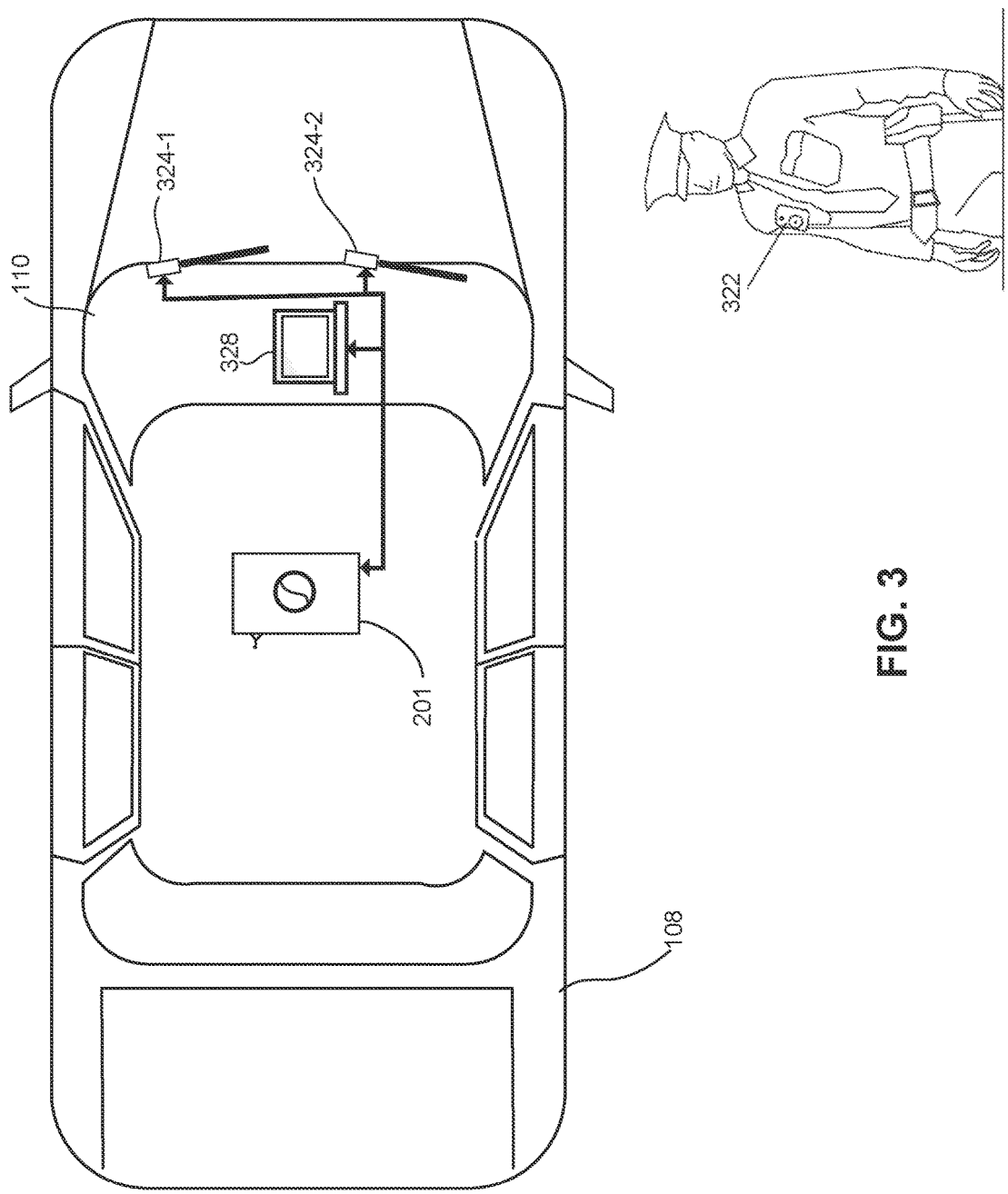
FIG. 3 is an example of implementations of the camera assembly in accordance with one or more example embodiments.
Figure 4:
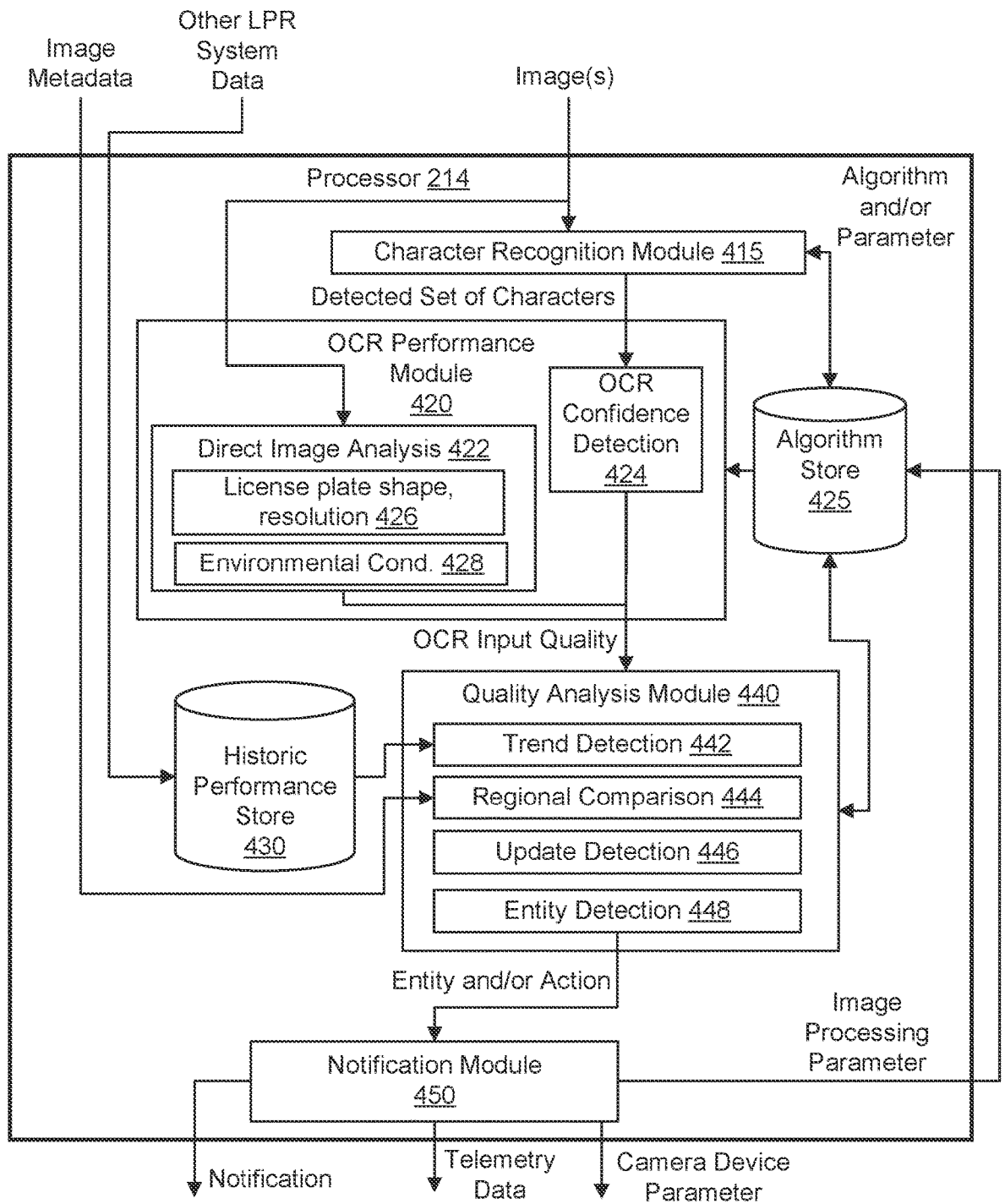
FIG. 4 is an example architecture of a camera apparatus in accordance with one or more example embodiments.

FIG. 2E illustrates one installation of an LPR system where just one light emitting apparatus 230 is combined with the camera apparatus 201. The device may be mounted inside a vehicle, or outside a vehicle. For example, as illustrated in FIG. 3, an LPR system 300 may be mounted inside a vehicle 108. LPR system 300 may comprise camera apparatus 201 with brief reference to FIG. 2A and/or FIG. 2B. In embodiments, LPR system 300 may comprise light emitting apparatus 230, including one that is integrated in a same housing as camera apparatus 201 with brief reference to FIG. 2E. Alternately or additionally, an LPR system may comprise a processing hub communicatively coupled to a camera apparatus, wherein the processing hub comprises a processor configured to apply one or more operations to each image captured by the camera apparatus and provided to the processing hub. An image sensor of LPR system 300 may be oriented in a direction toward an environment outside vehicle. The image sensor of LPR 300 may be aligned with a window of vehicle 108. For example, the image sensor may be aligned to capture one or more images through windshield 110. Moreover, the device may be capable of over-the-air (OTA) software updates to its software and data. The system 300 may also seamlessly connect with a local, wireless network comprising other components in the vehicle 108 and accessories 322 carried by or worn on the operator of the vehicle 108. For example, LPR system 300 may be coupled via one or more local wired or wireless networks to a user device 328 and one or more windshield wipers 324. The user device may comprise one or more of a mobile data terminal fixedly mounted in vehicle 108, portable computing device, display, speaker, warning light system, mobile device, or other device configured to provide visual or audible information to a user. The one or more windshield wipers 324 may comprise a first windshield wiper 324-1 and a second windshield wiper 324-2. Each windshield wiper of the one or more windshield wipers 324 may comprise a controller coupled to a wiper blade, wherein the controller is configured to selectively move the wiper blade across windshield 110 responsive to a control signal. Moreover, connecting with the local network provides the device 201 with event notifications, such as when the operator opens the car door, activates a police car's light/siren bar, and other events, so the device 201 can react accordingly. Once connected with the local network of devices, the device 201, 412 may connect as illustrated in FIG. 4 with a computing device 414 to assist it with calculations, storage, and other computations.

Although the grid pattern 230 in FIG. 2F is illustrated as a rectangular arrangement, the configuration of light sources (e.g., LEDs) in a grid is not limited to such arrangements. The grid may be a circular grid, elliptical grid, or any other shape conducive to generation of an illumination pattern. The mounting apparatus may operate in response to an electrical signal received from a micro-controller or other external source. As a result, the light emitting apparatus 230 may generate a customized illumination cone as desired. Although LEDs are used as one example of a light source, other types of lighting elements, such as halogen bulbs and the like are contemplated for use with the system. LEDs, however, may be preferred due to their fast response time, ability to be switched on and off at a high frequency without substantially impacting bulb life, and lower power consumption. In some examples, the LEDs and other light sources may emit light in the infrared frequency range to aid in image capture in low-light or night time situations. Another benefit of infrared light is that it select frequencies of infrared light are non-visible to the eye, thus has a less negative impact on operators of target vehicles in oncoming traffic. Furthermore, infrared light may be desirable in situations where covertness is desired. For example, the LEDS and other light sources may emit infrared light comprising a peak wavelength of between 800 nanometers and 850 nanometers, between 850 nanometers and 900 nanometers, between 900 nanometers and 950 nanometers, between 950 nanometers and 1000 nanometers, between 1000 nanometers and 1100 nanometers, or between 800 nanometers and 1100 nanometers according to various embodiments described herein.

Referring to FIG. 2F, a standalone light emitting apparatus 230 is illustrated. The light emitting apparatus 230 may include a micro-controller 204, similar to the one in the camera apparatus 201, for controlling configuration settings of the light emitting apparatus 230. The light emitting apparatus 230 provides functionality to the system because it generates and emits the illumination pattern that improves image capture quality. The light emitting apparatus 230 may be mounted to a vehicle such as a police car, motorcycle, or other vehicle. The apparatus 230 may be mounted inside the vehicle, or may be securely mounted to the outside of the vehicle. The light emitting apparatus 230 comprises a body, at least one light source, a mounting apparatus 232 inside the body that couples the light source to the body, and a micro-controller. As illustrated in FIG. 2F, the mounting apparatus 232 may be coupled with the light source such that it permits the micro-controller to automatically, and without human intervention, tilt the light source along at least one of its roll, pitch, and yaw axes. In some examples, the mounting apparatus might allow adjustment in all three axes in response to a tilt command from the micro-controller. The end result of the tilting and re-orienting of the light sources is an asymmetrical illumination cone pattern being emitted towards a lane near the one on which the subject vehicle is traveling. The target vehicle's lane need not necessarily be adjacent to the subject vehicle's lane. Rather, the system may be trained to adapt to different road configurations in different geographic areas.

In addition to tilt commands, the micro-controller may also generate and send illumination commands to the light source. The light source may be further configured to emit light at one of a low, medium, and high illumination in response to an illumination command. Illumination commands are not limited by the enumerated list provided here. Rather, illumination commands may include any denotation of varying illumination levels.

Whether a light emitting apparatus 230 will emit low, medium, or high illumination is based on the values generated by the distance measurement component and the speed delta measurement component. In one example, the distance measurement component and the speed measurement component may share a laser beam generator positioned in the body. The laser beam generator is configured to emit a laser beam to measure the approximate distance to the target vehicle and the relative speed of the target vehicle. Such measurements are then sent to the micro-controller for rapid decision making. In an alternate embodiment, an external device may provide tilt commands and illumination commands through an external port interface in the light emitting apparatus 230.

Referring to FIG. 3, in some embodiments, the LPR system 300 comprises camera apparatus is a mountable camera that provides a point of view associated with the subject vehicle. In some embodiments, the camera apparatus may be modified to be a device carried by the user, such as mounted onto a helmet. In one example (see FIG. 3), a camera apparatus of the LPR system 300 may automatically start, pause, stop, etc. based on events received via a short-range wireless interface with the vehicle sensors of vehicle 108. For example, if a subject vehicle 108 is standing still at rest, the vehicle's speed delta may register at a lower value. As such the camera apparatus may adjust its settings configuration via the micro-controller to accommodate the environment. Meanwhile, a memory (e.g., memory 210) of the camera apparatus of the LPR system 300 may also store event information in association with captured images to record conditions at the time of image capture. This information may be useful when auditing data for potential use in a legal proceeding.

Moreover, connecting with a local network may provide the LPR system 300 with event notifications, such as when the operator opens the car door, activates a police car's light/siren bar, and other events, so the device 201 can react accordingly. For example, the LPR system 300 may automatically turn ON or OFF the camera device based on the law enforcement vehicle's status—e.g., if siren alarm is ON, if siren lights are ON, if the vehicle is driving at high speeds, whenever movement is detected. In addition, one or more features disclosed herein may be, in some appropriate examples, embodied in a bodycam worn on a police officer. In such embodiments, the functionality may be purposefully culled to accommodate a smaller battery. It may also be embodied in a drone (UAV) or other mobile device. An external system may send a command to the processor of the LPR system to cause the processor to activate and capture the first image, then the second and subsequent images. In some examples, the external system may comprise at least one of a remote command center, another police vehicle, and/or a body-camera device. Meanwhile, when multiple vehicle license plates are detected in a single image capture, the LPR system might attempt to simultaneously perform the operations for each of the plates.

Regarding the subject vehicle, it may be a police patrol car, but can be any road or off-road vehicle (or even flying vehicle), including jeeps, trucks, motorcycles, ambulances, buses, recreational vehicles, fire engines, drones, and the like. The target one or more vehicles can likewise be any combination of any types of vehicles, and will be in the proximity of the subject vehicle in any of numerous different placements. Some of the target vehicles will have rear license plates, front license plates, or both front and rear plates.

Regarding mounting locations, one or more cameras may be mounted at the front and/or rear portions of the subject vehicle. Mounting can be on the bumpers or anywhere else, and can even be located in other positions such as in the siren tower on top of the subject vehicle or inside the cab behind windshield 110. The one or more cameras can be mounted in the center line of the subject vehicle, or off-center in any suitable manner. The one or more cameras may be mounted above the American Standard 1 (AS1) line of a windshield so as to not obscure a vehicle operator's view through the windshield. The at least one camera provides front, rear, side, and/or a combination of coverage. A second, third, or more other cameras may optionally be included on the subject vehicle. In some embodiments, a plurality of cameras may be mounted on the subject vehicle in suitable locations (e.g., front, rear, side, or top) to allow up to 360 degrees of field of view for image capture. Moreover, the camera assembly may be programmed to operate autonomously in background mode, e.g., without requiring operator input. The camera assembly may, in some embodiments, alert the operator when the camera assembly has identified a possible safety (or legal-related) concern, for example, using the captured license plate information of neighboring vehicles. The camera assembly may, in some embodiments, operate continuously for an extended period of time while the subject vehicle is patrolling an area, and can be turned on and off by the operator as desired.

In embodiments, an LPR system may have an associated, measurable performance. The performance may indicate an accuracy and/or effectiveness of the LPR in reading one or more license plates represented in one or more captured images. The performance may be determined in accordance with various one or more metrics. For example, the performance may comprise a number of license plate read (e.g., detected) over a period of time, a confidence score associated with each character detected in a captured image, an average confidence score for each detected character for a given license plate, a number of license plates detected under given environmental conditions, a percentage of detected license plate shapes detected for which a minimum number of license plate characters are read.

In embodiments, performance of an LPR system may be determined at least in part in accordance with a detected set of characters associated with a license plate represented in a captured image. The detected set of characters may be determined in accordance with an optical recognition algorithm applied to the captured image. The detected set of characters may be different from a set of characters represented in a license plate represented in the captured image. For example, the detected set of characters may comprise greater or fewer characters than the represented set of characters in accordance with a low performance of the LPR system. In embodiments, the detect set of character may comprise zero or more characters detected in a captured image.

In embodiments, each character of a detected set of characters may comprise a character and a confidence score. The character may comprise a single letter or a single number. The confidence score may indicate a computer-generated likelihood that the character is represented in the captured image. The confidence score may be indicated as a value within a range of confidence scores. For example, the confidence score may comprise a decimal between 0 and 1 and/or a percentage between 0% and 100%. A confidence score at one end of the range, such as 0 or 0%, may indicate a lowest likelihood of the character being represented in the captured image, while a confidence score at the other end of the range, such as 1.0 and a 100% confidence score may indicate a highest likelihood of the character being represented in the captured image.

Over time, a variation in the performance of an LPR system may occur. The variation may be unique to the LPR system. The variation may specifically occur in accordance with (e.g., due to) an individual entity associated with the LPR system. Entities associated with the LPR system may comprise, for example, components of a camera apparatus or vehicle of the LPR system. The vehicle of the LPR system may comprise a vehicle to which the LPR system is mounted. For example, a windshield may be dirty, decreasing an accuracy with which an image sensor may capture an image in which a license plate is represented. Alternately or additionally, a lens of the image sensor may change with time (e.g., aging), detrimentally changing a fidelity and/or alignment of light transmitted through the lens. The lens may alternately or additionally have fingerprints imparted thereon, which may also impact the transmission of light through the lens prior to capture of an image. A lens and/or image sensor of an LPR system may also be physically struck or otherwise become misaligned relative to an external environment in which a license plate may be presented, thereby decreasing a visible range in which license plates may be captured in an image. A lens and/or image sensor of an LPR system may alternately or additionally be directed at an obstruction (e.g., an object or person) preventing a legible, usable image from being captured for more than a threshold amount of time.

In embodiments, a variation in performance may occur due to an environmental condition in which the LPR system is used. The environmental condition may comprise a weather condition. For example, precipitation or a time of day may cause a change in performance of the LPR system. Alternately or additionally, the environmental condition may comprise a physical area in which the LPR system is used. For example, the LPR system may detect more license plates in a residential area than in an agricultural area.

A variation in performance due to the environmental condition may differ from a variation due to an entity of the LPR system in various ways. For example, an environmental condition may cause a periodic variation, while the entity may cause an aperiodic variation. An environmental condition may cause a variation for a shorter period of time, while an entity associated with the LPR system may cause a variation for a longer period of time. For example, a period of time of a variation caused by environmental condition may comprise multiple hours (e.g., <24 hours, <12 hours, <4 hours, etc.), while a period of time of a variation caused by an entity associated with the LPR system itself may comprise a day or more (e.g., >24 hours, >48 hours, >96 hours, etc.). An environmental condition may cause a temporary variation, while a variation associated with the LPR system may increase in severity over time until an action is performed.

Embodiments according to various aspects of the present disclosure overcome problems associated with these variations. Certain embodiments enable variations caused by an entity associated with an LPR system to be identified. The variations may be distinguished from variations caused by an environmental condition and separately addressed. In embodiments, the variations may be identified using processes employed for reading license plates, thereby avoiding a need for additional images to be captured or separate sensors to be added to the system to detect these variations. The utility of the processes employed for reading license plates, such as optical character recognition, may be increased by further using such processes to detect the variations associated with an entity of the LPR system. Accordingly, embodiments according to various aspects of the present disclosure provide improvements to LPR systems and the technical field of automatic license plate reading. Certain embodiments provide particular technical improvements to LPR systems that are mounted on a vehicle.

FIG. 4 is an example architecture of a processor of a camera apparatus in accordance with one or more example embodiments. In the embodiment of FIG. 4, the processor 214 of the camera apparatus 201 comprises a character recognition module 415, an OCR performance module 420, an algorithm store 425, a historic performance store 430, a quality analysis module 440, and a notification module 450. The OCR performance module 420 comprises an OCR confidence detection 424 and a direct image analysis 422, wherein the direct image analysis comprises modules configured to perform a license plate shape and resolution analysis 426 and environmental condition analysis 428. The quality analysis module 440 comprises modules configured to perform trend detection 442, regional comparison 444, update detection 446, and entity detection 448. In implementation, the processor 214 of the camera apparatus 201 may comprise additional, fewer, or different modules and features than those shown in FIG. 4 or discussed in detail herein.

The character recognition module 415 receives one or more images for processing. In some embodiments, the character recognition module 415 receives one or more images from an image sensor of the camera apparatus 201 responsive to the image sensor capturing each image of the images. In other embodiments, the character recognition module 415 receives one or more captured images from a memory 210 of the camera apparatus 201. In other embodiments, the character recognition module 415 receives one or more images from another entity associated with the LPR system, such via a cloud or server of the LPR system, from a user device of the LPR system, or the like.

The character recognition module 415 receives one or more optical character recognition (OCR) algorithms and/or one or more image processing algorithms from the algorithm store 425 and applies the received algorithms to captured images to detect one or more sets of characters of license plates in the captured images. The character recognition module 415 may apply one or more image processing algorithms to the captured images. An image processing algorithm may be configured to perform one or more actions to the captured image. The one or more actions may alter the captured image. The one or more actions may alter how the captured image is subsequently displayed. The one or more actions may alter how the captured image is subsequently stored and/or indexed in a data storage device. For example, the one or more actions may include one or more of resizing the image, modifying brightness, contrast, or other qualities of the image, zooming in on a portion of the image, cropping the image, associating the image with metadata (e.g., location data, a timestamp, etc.), and the like.

The character recognition module 415 applies an OCR algorithm from the algorithm store 425 to captured images to detect one or more sets of characters of license plates in the captured images. The OCR algorithm may be any algorithm configured to detect characters or text in image data and/or may be a machine learning model configured to receive an image as input and to output a set of detected characters in the input image. The detected set of characters may, for example, comprise a detected character for each character represented in the captured image. Additionally or alternatively, the detected set of characters may comprise zero (e.g., unidentified) characters, characters with low confidence, and/or more than or less than one character for each character represented in the captured image. For example, and with brief reference to FIG. 5, a set of characters detected from first image 505 may comprise a number of characters of six characters and specific characters "ABC123". For third image 515, a set of characters may comprise zero characters and no specific characters due to irregular blurring of a license plate represented in the image. The detected sets of characters are transmitted for display to a user of the LPR system. In some embodiments, the detected sets of characters are additionally transmitted to an OCR performance module 420. The OCR performance module 420 receives one or more algorithms from the algorithm store 425 and applies the retrieved algorithms to captured images and/or outputs of the character recognition module 415 to determine and track performance metrics for the camera apparatus 201. In some embodiments, the OCR performance module 420 comprises an OCR confidence detection algorithm 424 that applies an OCR confidence algorithm. The OCR confidence algorithm may be, for example, any algorithm or machine learning model configured to receive a captured image and an output of the OCR algorithm as input and to output a confidence score for the output of the OCR algorithm. In some examples, the confidence score is a numeric score between 0 and 1, wherein a 0 represents low confidence and a 1 represents high confidence. In other examples, the confidence score may be, for example, a range of values representing a lower threshold and an upper threshold for confidence of the output of the OCR algorithm, such that the confidence score may be a range from, for example, 0.2-0.3 based on differences in quality in portions of a captured image. In other examples, the confidence score may be any other representation of the confidence of the output of the OCR algorithm.

In some embodiments, the OCR confidence algorithm may be combined with the OCR algorithm, and/or may be a part of the same process or module as the OCR algorithm, e.g., such that module of the camera apparatus applies an algorithm that detects one or more sets of characters of license plates in captured images and further outputs a confidence score for the detected one or more sets of characters.

In some embodiments, the OCR performance module 420 additionally or instead applies a direct image analysis algorithm 422 to the captured image. The direct image analysis algorithm may be, for example, any algorithm or machine learning model configured to receive a captured image and to output a representation of the image quality. The direct image analysis algorithm may comprise a number of factors, including, for example, detection of license plate shape and resolution 426 and environmental conditions 428. In some embodiments, the direct image analysis algorithm is configured to output a set of values wherein a first value describes a type of blur or distortion in the image and wherein a second value describes an intensity or amount of blur or distortion of the captured image. For example, types of blur or distortion may be regular or irregular, or distortion of a captured image may be caused by occluding objects in a field of view of the image sensor.

Figure 5:
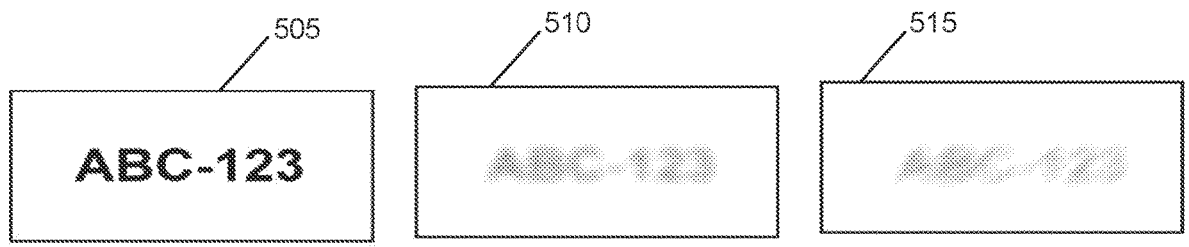
FIG. 5 is an example of types of blur in captured images in accordance with one or more example embodiments.

FIG. 5 is an example of types of blur in captured images in accordance with one or more example embodiments. Types of blur in captured images may be used by the LPR system to indicate a likely cause of low-quality images captured by the camera apparatus 201. A first image 505 has no blur. A second image 510 has regular blurring. Regular blurring is characterized by blurred characters and objects in a captured image being blurred uniformly or near-uniformly in all directions. Regular blurring may be caused by, for example, improper camera settings or improper lighting. A third image 515 has irregular blurring. Irregular blurring is characterized by blurred characters and objects in a captured image being blurred non-uniformly or directionally. Irregular blurring may be caused by, for example, movement by an object, movement by a camera apparatus 201 capturing the image, and the like. Because regular blurring and irregular blurring are often prescribed to different causes, actions to correct blurring in captured images may vary depending on the type and severity of the blurring.

In other embodiments, the OCR performance module 420 may additionally or instead apply a license plate shape and resolution algorithm 426 to the captured image. The license plate shape and resolution algorithm 426 detects, for example, one or more license plates in the captured image and a corresponding shape and resolution of the one or more license plates. Distortion of license plate and/or low resolution may be caused by, for example, an angle of the captured image being taken, a speed of the vehicle during the image capture, or the like, and may correspond to low quality of the captured image for character recognition and processing.

In other embodiments, the OCR performance module 420 may additionally or instead apply an environmental conditions algorithm 428 to the captured image. In some embodiments, the environmental conditions algorithm 428 detects signs of environmental conditions such as weather, dust, smoke, and the like from the captured image, e.g., based on resolution or quality of the captured image, analysis of lighting or other signs of inclement weather, a time associated with the image capture, and the like. Environmental conditions can result in low image quality due to, for example, raindrops or other condensation on a camera apparatus 201 or windshield, low lighting conditions, and the like, and may result in temporary or prolonged quality drops to the performance of the LPR system 300.

In other embodiments, the OCR performance module 420 may additionally or instead apply one or more other algorithms not discussed herein to the captured image, the output of the OCR algorithm, or outputs of the OCR confidence algorithm and/or the direct image analysis algorithm. The one or more other algorithms may be any algorithm or machine learned model configured to output information describing one or more performance metrics of the OCR algorithm, quality of the captured image, or the like.

In some embodiments, the OCR performance module 420 may combine outputs from the one or more algorithms applied to the detected set of characters to generate an OCR input quality score. For example, the OCR performance module 420 may receive a first value representing a confidence score (e.g., 0.8) and a first set of values representing blur type and amount of a captured image (e.g., [1.0, 0.7]). In an example, the OCR performance module 420 may combine the values to a set of values (e.g., [0.8, 1.0, 0.7]), wherein the set of values is used as an OCR input quality score. In another example, the OCR performance module 420 may additively combine the values (e.g., 2.5), wherein the additive value is used as an OCR input quality score. In other examples, other methods and equations may be used to generate the OCR input quality score.

In some embodiments, the OCR performance module 420 may apply one or more algorithms to captured images and corresponding data in real-time or in near real-time, e.g., as images are captured and processed by the character recognition module 415. In other embodiments, the OCR performance module 420 may apply one or more algorithms to captured images and corresponding data at regular time periods, e.g., every hour, or at regular points during image capture, e.g., every 5 images, every 10 images. In other embodiments, the OCR performance module 420 may apply the one or more algorithms to captured images and corresponding data responsive to one or more environmental criteria being met. For example, the OCR performance module 420 may begin processing responsive to a vehicle corresponding to the LPR system remaining in a location for longer than a threshold period of time (e.g., idling). The one or more environmental criteria may, in some examples, be established to ensure that processing by the OCR performance module 420 does not require an excess of processor resources during periods in which other modules or functions require processor resources. For example, the LPR system may require a greater amount of resources to be used by the character recognition module 415 when a vehicle corresponding to the LPR system is in an environment with a large number of license plates, e.g., a parking lot or parking garage.

The algorithm store 425 stores and maintains one or more algorithms and/or machine learning models for use by the character recognition module 415 and the OCR performance module 420. In some embodiments, the machine learning models stored herein refer to any model that uses one or more machine learning operations to output one or more performance or quality metrics of the LPR system, or that is trained on information comprising captured image data, OCR outputs corresponding to the captured image data, metadata including timestamps, environmental conditions, location data, and the like. In practice, the machine learning models can use or be trained by any machine learning operation, or any combination of machine learning operations for prediction or analysis of LPR system performance or quality. For example, the machine learning models may use machine learning operations including one or more of: a generalized linear model, a generalized additive model, a non-parametric regression operation, a random forest classifier, a spatial regression operation, a Bayesian regression model, a time series analysis, a Bayesian network, a Gaussian network, a decision tree learning operation, an artificial neural network, a reinforcement learning operation, linear/non-linear regression operations, a support vector machine, a clustering operation, and a genetic algorithm operation.

The historic performance store 430 stores and maintains data describing performance of the camera apparatus 201 over time. In some embodiments, the historic performance store 430 receives and stores captured images and corresponding OCR output information in conjunction with outputs from the one or more OCR performance algorithms, such as the OCR confidence algorithm and the direct image analysis algorithm. The historic performance store 430 may additionally receive metadata corresponding to the captured images and respective outputs, such as, for example, a timestamp indicating a time of the image capture, a location corresponding to the image capture, one or more environmental conditions (e.g., weather, lighting) corresponding to the image capture, one or more camera apparatus settings (e.g., flash on/off, filtering, and the like) corresponding to the image capture, and the like. In other embodiments, the historic performance store 430 may additionally receive and store other data or metadata relevant to the performance of the LPR system or to the quality of images captured by the camera apparatus 201. For example, the historic performance store 430 may receive other image metadata and/or other LPR system data from one or more other entities associated with the LPR system, e.g., a central server or cloud, one or more other LPR systems within communications range of the LPR system, or the like.

The quality analysis module 440 receives an OCR input quality score from the OCR performance module 420 and analyses performance metrics of the LPR system 300 and determines aberrations, events, or other factors requiring action to improve performance of the LPR system. In some embodiments, the quality analysis module 440 compares the OCR input quality score to corresponding threshold values. For example, the quality analysis module 435 may receive a set of values representing a confidence score, a type of blur, and an amount of blur, e.g., (0.8, 1.0, 0.7). The quality analysis module 435 compares the set of values to corresponding threshold values, wherein, for example, a set of values at or above threshold values of (0.7, 0.9, 0.6) indicate poor quality or poor performance by the LPR system 300. Responsive to the one or more outputs exceeding corresponding threshold values, the quality analysis module 440 flags the captured image corresponding to the received outputs as indicative of poor quality or poor performance of the LPR system.

In other embodiments, the quality analysis module 440 receives one or more additional outputs from the OCR performance module and compares the one or more additional outputs to expected outputs and/or threshold values. For example, the quality analysis module 440 may receive outputs from the license plate shape and resolution algorithm 426 indicating whether a shape corresponding to a license plate is detected in a captured image, wherein the quality analysis module 440 analyzes the outputs to determine whether a rectangular or approximately rectangular shape is detected. Responsive to no shape corresponding to a license plate being detected, the quality analysis module 440 flags the captured image as indicative of poor quality or poor performance of the LPR system. Alternately or additionally, responsive to a shape corresponding to a license plate being detected and a detected set of characters comprising at least one of zero characters and/or a confidence score less than a threshold confidence score, the quality analysis module 440 flags the captured image as indicative of poor quality or poor performance of the LPR system. In another example, the quality analysis module 440 may analyze the outputs of the license plate shape and resolution algorithm 426 to determine that an output resolution of the license plate shape and resolution algorithm exceeds a threshold resolution. Responsive to an output resolution of the license plate being below the threshold resolution, the quality analysis module 440 flags the captured image as indicative of poor performance or poor quality. Alternately or additionally, responsive to an output resolution of the license plate exceeding the threshold resolution and the detected set of characters comprising at least one of zero characters and/or a confidence score less than a threshold confidence score, the quality analysis module 440 flags the captured image as indicative of poor performance or poor quality. In another example, the quality analysis module 440 may receive captured images corresponding to zero detected sets of characters (e.g., caused by no license plates detected; low resolution images; or the like) for more than a threshold period of time during operation of the LPR system. Responsive to the OCR algorithm failing to detect characters for more than the threshold period of time during operation of the LPR system, the quality analysis module 440 flags a captured image or set of captured images as indicative of poor quality or poor performance of the LPR system. In another example, the quality analysis module 440 may receive captured images corresponding to a confidence score less than a threshold confidence score (e.g., low confidence) for more than a threshold period of time during operation of the LPR system. Responsive to the OCR algorithm generating a detected set of characters comprising a low confidence score for more than the threshold period of time during operation of the LPR system, the quality analysis module 440 flags a captured image or set of captured images as indicative of poor quality or poor performance of the LPR system. Accordingly, the quality analysis module 440 may enable a given image analysis (e.g., OCR algorithm) to provide information regarding a license plate captured in an image, as well as information regarding the LPR system with which the image was captured. Such an arrangement may increase the functionality of an LPR system, enabling the LPR system to further detect and address a physical issue with an entity of the system. The increased functionality may be enabled without requiring an additional physical sensor or other hardware to be added to the LPR system.

In other embodiments, the quality analysis module 440 performs trend detection 442 on one or more outputs of the OCR performance module 420. Trends may be established or determined over a threshold period of time, e.g., a week, three days, or the like, and may be used to avoid performing unneeded actions to the LPR system to address temporary fluctuations in quality or performance of the LPR system. For example, weather conditions or obstructions (e.g., pedestrians, environmental obstructions such as buildings) may cause quality of captured images and/or performance of the LPR system to drop temporarily. However, action may not be necessary unless the condition persists for more than the threshold period of time. The quality analysis module 440 may track one or more outputs of the OCR performance module 420 over the threshold period of time and, responsive to the one or more outputs being consistently at or below a threshold value during the threshold period of time, the quality analysis module 440 flags a captured image or a set of captured images as indicative of poor quality or poor performance of the LPR system.

In other embodiments, the quality analysis module 440 performs a regional comparison 444 of the performance of the LPR system 300 to other LPR systems. The quality analysis module 440 receives one or more outputs from the OCR performance module 420 and global performance data from one or more other LPR systems within a threshold distance of the LPR system. For example, the quality analysis module 440 may receive global performance data from a communications channel established with the one or more other LPR systems (e.g., via BLUETOOTH or cellular connectivity). In another example, the one or more other LPR systems may provide respective performance data to a central server or cloud, and the quality analysis module 440 may receive global performance data from the central server or cloud. Based on the outputs from the OCR performance module 420 being significantly different from the global performance data of the other LPR systems, the quality analysis module 440 flags the captured image corresponding to the received outputs as indicative of poor quality or poor performance of the LPR system.

In other embodiments, the quality analysis module 440 receives one or more outputs from the OCR performance module 420 and historic performance data from the historic performance store 430 corresponding to similar environmental conditions. Based on the outputs from the OCR performance module 420 being significantly different from the historic performance data, the quality analysis module 435 flags the captured image corresponding to the received outputs as indicative of poor quality or poor performance of the LPR system.

In some embodiments, the quality analysis module 440 may compare outputs from the OCR performance module 420 to one or more thresholds, historic performance data, and/or global performance data from similar environments, and may flag the captured image as indicative of poor quality or poor performance of the LPR system responsive to more than a threshold amount of criteria being met (e.g., outputs exceeding all thresholds, being significantly different than historic performance data, and being significantly different than current performance data from similar environments).

Responsive to the quality analysis module 440 flagging a captured image and corresponding data as being indicative of poor quality or poor performance, the quality analysis module performs an update detection 446. As discussed further in conjunction with FIG. 6B, one-time changes such as updates to parameters of an algorithm, camera hardware, or the like may impact quality of captured images or performance of the LPR system 300 in various ways. Quality or performance of the LPR system after a one-time change is implemented are preferably not compared to quality or performance of the LPR system before the one-time change is implemented. As such, the quality analysis module 440 determines whether an update or other one-time change has been performed within a previous time period (e.g., within a past week, within a past three days). In some embodiments, responsive to determining that an update or other one-time change has been performed, the quality analysis module 440 may determine that no action should be performed. In some embodiments, responsive to determining that an update or other one-time change has been performed, the quality analysis module 440 may delay notifications about quality or performance of the LPR system until more than a threshold amount of time after the update or one-time change is implemented has passed (e.g., 1 day, 1 week) so as to establish an updated baseline quality or performance for the updated LPR system.

Responsive to no update or other one-time change being performed within the previous time period, the quality analysis module 440 performs an entity detection 448 to determine a cause and entity associated with the poor quality or poor performance of the LPR system. Causes for poor quality or poor performance may be, for example, a dirty windshield of a vehicle between the camera apparatus 201 and license plates in captured images; a dirty camera lens on the camera apparatus 201; objects or people obstructing license plates in a captured image; settings of a camera apparatus; settings of an image processor. Some causes may be associated by the quality analysis module 440 with actions that may be taken to correct the poor quality or performance, e.g., initiating a windshield wiper protocol to clean a dirty windshield, notifying a user to clean or replace a dirtied camera lens, notifying a user to move to an unobstructed area to capture a new image, updating one or more parameters or settings of the camera apparatus 201 or the image processor, or the like.

In some embodiments, the quality analysis module 440 determines one or more causes of poor quality or poor performance based on outputs from the OCR performance module 420, e.g., wherein one or more values being within set thresholds or combinations of thresholds may indicate particular causes. For example, a dirty windshield or dirty camera lens may generate different outputs from the OCR performance module than an obstruction in the captured image. In other embodiments, the quality analysis module 440 may additionally or instead determine causes based on historic performance data from the LPR system or one or more other LPR systems being positively associated with causes for poor quality or poor performance. In other embodiments, the quality analysis module 440 may additionally or instead determine causes based on current or recent environmental conditions, such as, for example, weather, time of day, time of year, and the like, which may impact conditions for capturing images.

In some embodiments, the quality analysis module 440 may receive and apply a machine learning algorithm to one or more outputs of the OCR performance module 420 or other information to perform one or more of the functions described herein. For example, the quality analysis module 440 may apply one or more machine learning model for one or more of trend detection 442, regional comparison 444, update detection 446, or entity detection 448.

The notification module 450 receives information describing one or more entities requiring one or more actions from the quality analysis module 440 and associated information to one or more entities of the LPR system, such as users of the LPR system or associated vehicle systems. In some embodiments, the information comprises information describing current performance of the LPR system 300. In other embodiments, the information may additionally or instead identify the one or more entities determined by the quality analysis module 440. In other embodiments, the information may further comprise one or more actions to be performed to maintain or improve current performance of the LPR system. For example, based on information from the quality analysis module 440, the notification module 450 identifies one or more entities of the LPR system and transmits a notification to the one or more entities. Notifications may comprise, for example, information about the cause of poor quality or poor performance of the LPR system and an instruction to perform, manually or automatically, one or more corrective actions.

In some embodiments, the notification module 450 transmits a notification to be displayed to a user of the LPR system and/or the vehicle corresponding to the LPR system. For example, the notification may be transmitted to a display of the LPR system, may be transmitted to a vehicle system to be displayed or played as audio data by the vehicle, and/or may be transmitted to a client device, e.g., a cellular device, of the user to be displayed or played as audio data by the client device. In other embodiments, the notification module 450 additionally or instead transmits a notification to a vehicle system of the vehicle corresponding to the LPR system to automatically initiate a cleaning protocol for a dirtied windshield or other component of the vehicle. In other embodiments, the notification module 450 additionally or instead transmits parameter information, e.g., camera device parameters, to one or more modules of the camera apparatus 201 or the LPR system 300, e.g., to update or implement one or more algorithms for image processing, optical image recognition, or the like. For example, the notification module 450 may transmit an instruction to the character recognition module 415 to implement a dirty image processing algorithm in place of standard image processing algorithms, wherein the dirty image processing algorithm is an algorithm or machine learning model trained on images captured through a dirty windshield or dirty camera lens, so as to improve performance of the LPR system until such a time when a user cleans the windshield or camera lens. In other embodiments, the notification module 450 additionally or instead transmits telemetry data to a remote computing device (e.g., another vehicle, a central server). The telemetry data may enable the remote computing device to include the telemetry data from LPR system to be included information used to perform a regional comparison (e.g., regional comparison 444) by another LPR system within a threshold distance from LPR system 300.

Figure 6A:
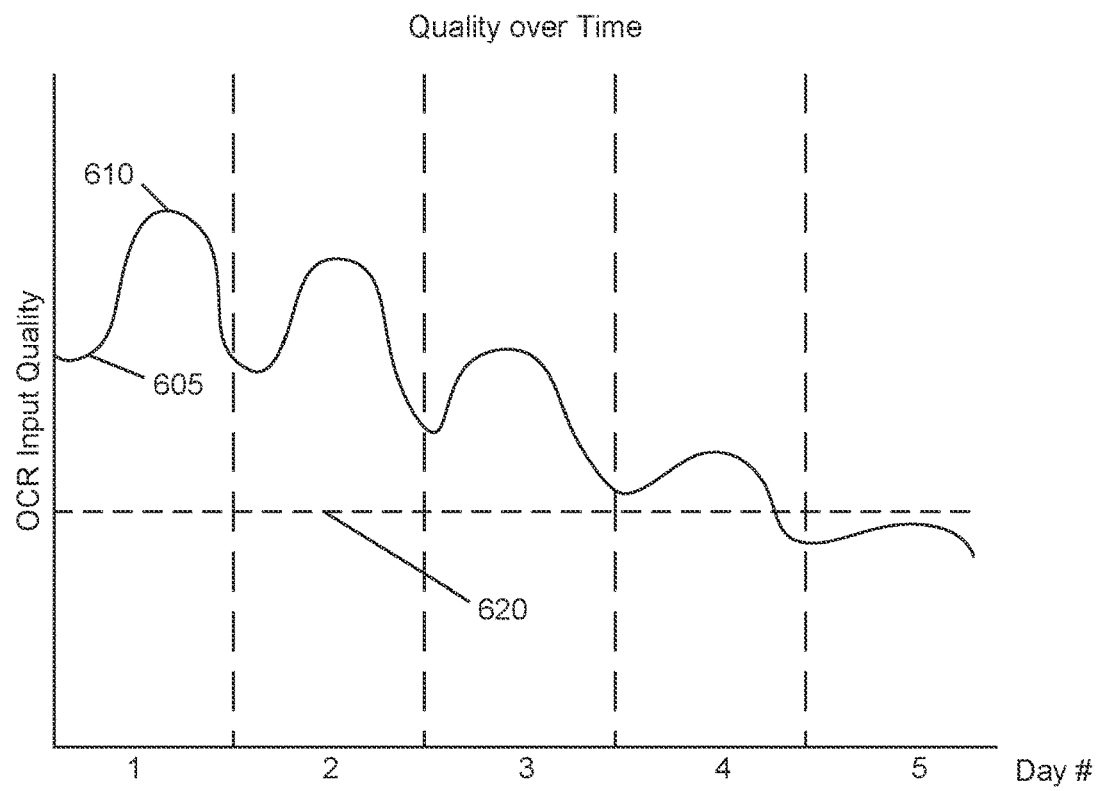
FIGS. 6A and 6B are example graphs of image quality over time in accordance with one or more example embodiments.
Figure 6B:
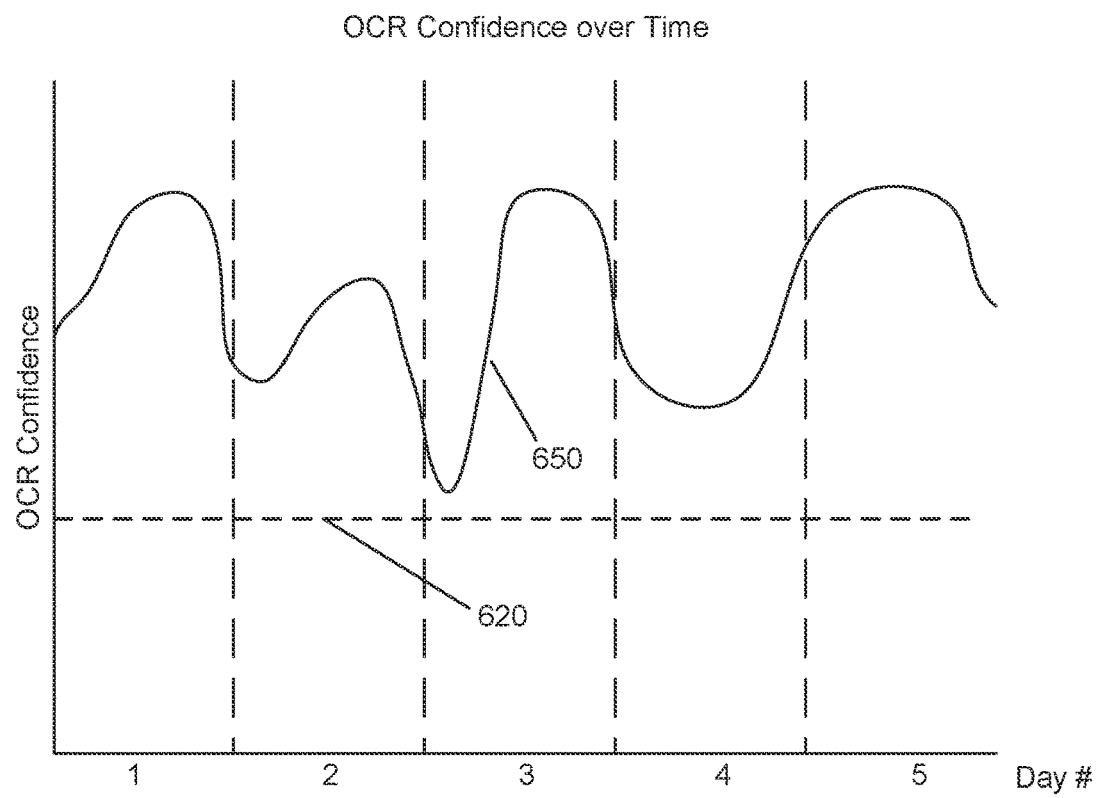

FIGS. 6A and 6B are example graphs of image quality over time in accordance with one or more example embodiments. FIG. 6A is an example graph of image quality degrading over time. During ordinary performance, it is common for image quality, and consequently performance of the LPR system, to oscillate during an active period based on environmental conditions such as, for example, weather changes, changes in lighting, movement of a vehicle associated with the LPR system, volume of traffic encountered by a vehicle, and the like. As such, troughs 605 and peaks 610 may occur over the course of a day. As shown in FIG. 6A, however, it is possible for average quality during a day to decrease over time. The average quality may decrease over a period of time comprising multiple days. This may occur due to, for example, a windshield becoming gradually dirtier over time, a camera lens becoming gradually dirtier over time, or the like. As such, it is valuable for the LPR system to detect when the quality or performance is below a threshold value 620 for more than a threshold period of time (e.g., one hour, one day) and to initiate corrective actions to ensure that high quality and high performance are maintained.

FIG. 6B is an example graph of image quality impacted by a one-time change, such as an update to parameters of an algorithm, updated camera hardware, or the like. One-time changes may impact image quality or performance of the LPR system in various ways. FIG. 6B shows an example wherein a one-time change, such as an algorithm update or hardware update, provides a boost 650 to the quality of captured images and/or to the performance of the LPR system. For example, an update to the LPR system may cause a change in OCR confidence scores greater than one standard deviation for a point in time at which the change is applied. Other measurements of change and standards for irregular change in quality of captured images and/or performance of the LPR system may apply as well. However, other one-time changes may cause quality or performance to decrease. Quality or performance of the LPR system after a one-time change is implemented are preferably not compared to quality or performance of the LPR system before the one-time change is implemented, as drastic changes in quality or performance of the LPR system may correspond to the one-time change rather than to actionable causes such as dirty windshields, dirty camera lenses, and the like. In some embodiments, historic data describing quality or performance of the LPR system before the one-time change may be deleted, and notifications about quality or performance of the LPR system may be delayed until more than a threshold amount of time after the one-time change is implemented has passed (e.g., 1 day, 1 week).

Figure 7:
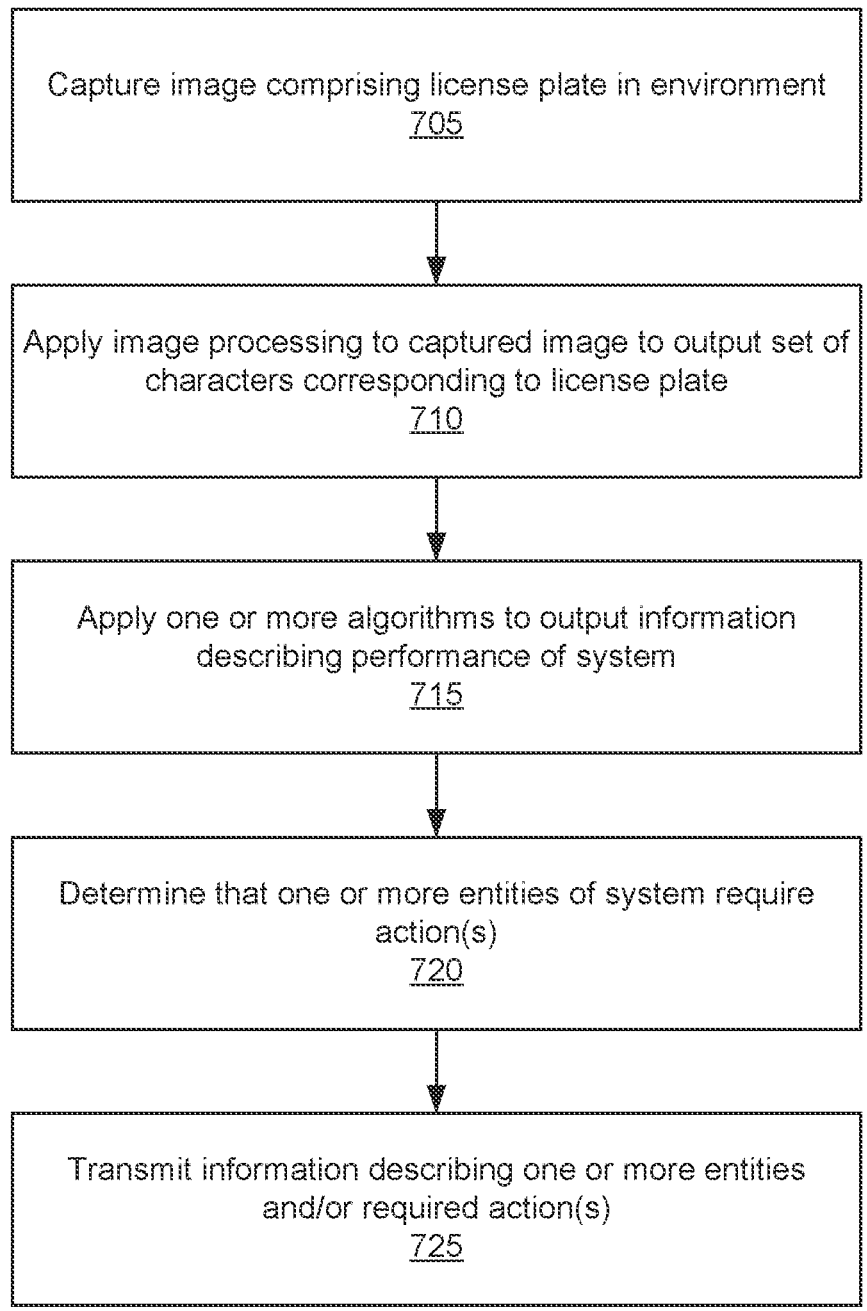
FIG. 7 is a flow diagram for an example method of detecting change in quality in captured images in accordance with one or more example embodiments.

FIG. 7 is a flow diagram for an example method of detecting change in quality in captured images in accordance with one or more example embodiments. The example method may be performed by one or more devices of an LPR system, such as a camera apparatus 201. A camera apparatus 201 captures 705 an image comprising a license plate in an environment. The license plate may be behind a transparent or translucent object, e.g., a windshield of a vehicle, or may be partially obscured, e.g., by objects or humans in the environment. The camera apparatus 201 applies 710 one or more image processing algorithms to the captured image to output a set of characters corresponding to the license plate. For example, the camera apparatus 201 applies an optical character recognition (OCR) algorithm to the captured image.

The camera apparatus 201 applies 715 one or more algorithms to output information describing performance of the ALPR system. In some embodiments, the camera apparatus 201 applies an OCR confidence algorithm configured to output a confidence level of the OCR algorithm. For example, an OCR confidence algorithm may be applied to a captured image and a set of characters output by the OCR algorithm. The OCR confidence algorithm outputs, for example, a numeric value between 0 and 1 (an "OCR confidence factor") representing a confidence level of the OCR algorithm. In some embodiments, the camera apparatus 201 additionally or instead applies a direct image analysis algorithm configured to output information describing blur in the captured image. The direct image analysis algorithm may be applied to the captured image, independent of an OCR algorithm. The direct image analysis algorithm outputs, for example, a set of values describing a type and an amount of blur in the captured image, e.g., wherein a type of blur is represented by a first value between 0 and 1 and an amount of blur is represented by a second value between 0 and 1. In other embodiments, other algorithms may additionally or instead be applied to one or more of the captured image and the output of the OCR algorithm. In other embodiments, one or more algorithms, including the OCR confidence algorithm and the direct image analysis algorithm, may be machine learned models, as described in conjunction with FIG. 4.

Based on the outputs of the one or more algorithms, the camera apparatus 201 determines 720 that one or more entities of the system require action and transmits 725 information describing the one or more entities and the required actions. In some embodiments, the camera apparatus 201 determines that one or more entities of the system require action responsive to an output or set of outputs of the one or more algorithms meeting or exceeding a threshold value or set of threshold values. For example, the camera apparatus 201 determines that an entity of the system requires action responsive to the OCR confidence factor being below a threshold value. In another example, the camera apparatus 201 determines that an entity of the system requires action responsive to a set of values output by the direct image analysis algorithm being above a set of threshold values. In another example, the camera apparatus 201 determines that an entity of the system requires action responsive to a set of values output by the direct image analysis algorithm being above a set of threshold values and OCR confidence factor being below a threshold value.

Entities of the LPR system requiring action may include, for example, a windshield of a vehicle between the camera apparatus 201 and the license plate in the captured image; a camera lens of the camera apparatus; the camera apparatus having one or more settings; the image processor having one or more settings; a housing of the camera proximate to one or more obstructions. For example, the camera apparatus 201 may determine that a windshield of a vehicle associated with the LPR system is foggy, unclean, or otherwise obstructed, and may transmit an instruction to a user of the LPR system to clean the windshield via, for example, a display interface of the LPR system, a display interface of the vehicle, or another client device associated with the user. In another example, the camera apparatus 201 may determine that a windshield of a vehicle associated with the LPR system is foggy, unclean, or otherwise obstructed, and may transmit an instruction to an onboard vehicle system to automatically initiate a cleaning protocol, e.g., starting windshield wipers. In another example, the camera apparatus 201 may determine that a camera lens of the camera apparatus is foggy, unclean, or otherwise obstructed, and may transmit an instruction to a user of the LPR system to clean or replace the camera lens via a display interface of the LPR system or camera apparatus or another client device.

In some embodiments, the camera apparatus 201 may transmit an instruction to a user of the LPR system to perform one or more of: modifying one or more settings of the camera apparatus (e.g., exposure time), modifying one or more parameters of the OCR algorithm (e.g., applying an initial algorithm to brighten or otherwise improve visibility of a captured image), modifying an angle or position of the camera apparatus to avoid obstacles obscuring the license plate. In some embodiments, the camera apparatus 201 may transmit an instruction to the LPR system or an onboard vehicle system to automatically perform one or more of: modifying one or more settings of the camera apparatus, modifying one or more parameters of the OCR algorithm, implementing one or more additional image processing algorithms.

In the example method of FIG. 7, the steps are performed by the camera apparatus 201. In other embodiments, one or more of the steps may be performed in whole or in part by another entity of the LPR system. Additionally, the method may comprise additional, fewer, or different steps, and the steps may be performed in a different order than described in conjunction with FIG. 7.

Figure 8:
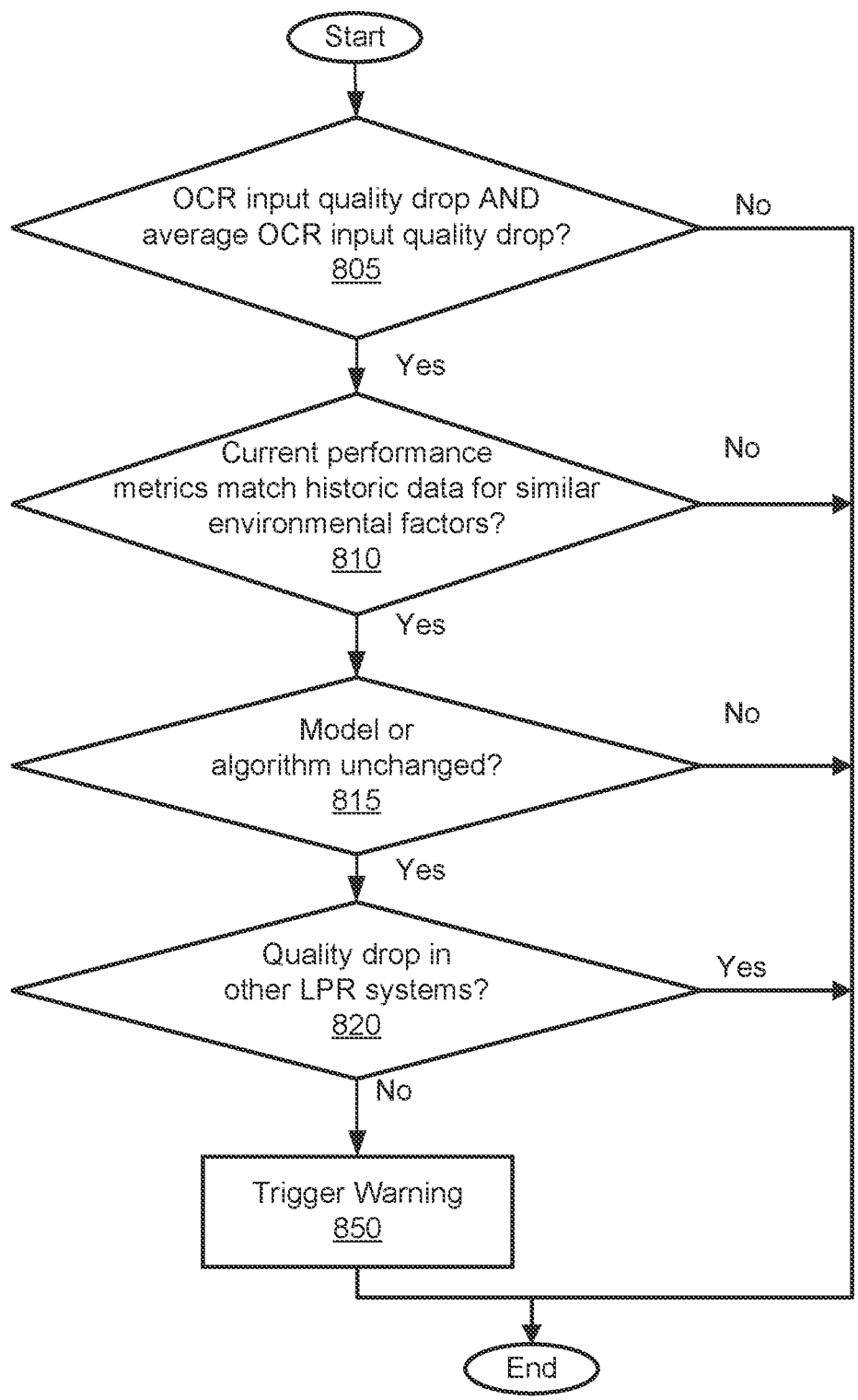
FIG. 8 is a flow diagram for an example method of detecting change in quality of captured images relative to environmental and surrounding conditions in accordance with one or more example embodiments.

In some embodiments, the LPR system 300 determines that one or more entities of the system require action based on historic data and environmental conditions, as shown in FIG. 8. FIG. 8 is a flow diagram for an example method of detecting change in quality of captured images relative to environmental and historic conditions. In embodiments, and with brief reference to FIG. 7, determining that one or more entities of the LPR system require action 720 may comprise one or more steps shown in FIG. 8. In order to correctly determine an action to recommend or perform, the LPR system 300 correctly identifies causes for quality drop in captured images. Extraneous factors such as updates to image processing or other algorithms, some environmental conditions such as weather, and the like may also impact performance of the LPR system. As such, it may be valuable for the LPR system 300 to provide a notification or transmit instructions for an action responsive to determining that a change in performance of the LPR system should not be attributed to these extraneous factors.

The LPR system 300 detects 805 a drop (e.g., decrease) in OCR input quality (e.g., OCR input quality score) and/or a drop in average OCR input quality. OCR input quality may be determined based at least in part by one or more algorithms as described above in conjunction with FIGS. 4 and 7, e.g., based on an output or set of outputs by a direct image analysis algorithm and/or an OCR confidence algorithm. OCR input quality may comprise, for example, one or more outputs from the direct image analysis algorithm, OCR confidence algorithm, and/or one or more other algorithms. In other examples, OCR input quality may comprise a combined output from the direct image analysis algorithm, OCR confidence algorithm, and/or one or more other algorithms. In some embodiments, OCR input quality may be stored by the camera apparatus 201 or by the LPR system in a local memory or data store, and may be processed to determine a running average OCR input quality over time.

For example, a running average OCR input quality may comprise OCR input quality metrics for a previous time period, e.g., 1 week, 1 month, 3 days, etc. In other embodiments, an average OCR input quality may be determined based at least in part on trends established over the previous time period. In other embodiments, OCR input quality may be processed and stored remotely.

In some embodiments, detecting 805 an OCR input quality drop may comprise detecting both an OCR input quality drop and an average OCR input quality drop. When both an OCR input quality drop and an average OCR input quality drop are detected, the method may continue to assess potential causes for the quality drops. When either of the OCR input quality drop or the average OCR input quality drop are not detected, the method may end. When the method ends, other steps of the method may not be performed. When the method ends, a warning, alert, notification, and/or instructions may not be provided by the LPR system, despite the detected OCR input quality drop and the average OCR input quality drop. As noted above, such an operation may avoid generating notifications when the change in LPR performance should be attributed to other extraneous factors.

In other embodiments, detecting a change in LPR system performance may comprise detecting one of an OCR input quality drop or an average OCR input quality drop, rather than detecting 805 both decreases as shown in FIG. 8. These other embodiments may enable a change in performance to be potentially detected in accordance with different periods of time. For example, detecting an average OCR input quality drop may enable a change to be detected over a longer period of time than an OCR input quality drop. These other embodiments may also or alternately decrease a number of initial conditions required to initially detect a fault in an LPR system.

In embodiments, and responsive to detecting the OCR input quality drop and the average OCR input quality drop, the LPR system 300 receives 810 historic data describing performance of the LPR system. In some embodiments, historic data corresponds to similar environmental factors as a current environment of the LPR system, e.g., having similar weather, time of day, time of year, camera model, and the like. In some embodiments, the LPR system 300 receives the historic data from a local memory or data store of the LPR system. In other embodiments, the LPR system 300 receives the historic data from a remote entity of the LPR system or a third-party system. Based on the historic data and current performance metrics of the LPR system, the LPR system 300 determines 810 whether current performance metrics match historic data for similar environmental factors. Determining 810 whether current performance metrics match historic data may comprise determining whether current performance metrics are within threshold values of historic performance metrics, indicating that current performance may be caused by environmental factors, or whether current performance metrics are outliers compared to historic performance metrics, indicating that current performance may be impacted by other factors. Determining 810 may comprise determining the current performance metrics match the historic data or do not match the historic data. When the current performance metrics are determined to match the historic data, the method may continue to assess potential causes for the quality drops. When the current performance metrics are determined to not match the historic data, the method may end.

In embodiments, and responsive to determining the current performance metrics match historic data for similar environmental factors, the LPR system 300 determines 815 whether a model or algorithm is unchanged. As discussed with regards to FIG. 6, a model or algorithm change may cause a change in OCR input quality that is independent of an entity of an LPR system that requires action. In some embodiments, the LPR system 300 may perform a check on one or more models and algorithms to determine that the one or more models and algorithms corresponds to an expected version number. The expected version number may comprise a software version number associated with the one or more models and algorithms. In other embodiments, the LPR system 300 may perform a check that no updates have been applied to the one or more models or algorithms within a threshold amount of time, e.g., within 1 day of the change in the OCR input quality. Determining 815 may comprise determining the model or algorithm change is unchanged or changed. When the model or algorithm change is determined to be unchanged, the method may continue to assess potential causes for the quality drops. When the model or algorithm change is determined to be changed, the method may end.

In embodiments, and responsive to determining the model or algorithm is unchanged, the LPR system 300 determines 820 whether other LPR systems or camera apparatuses within a threshold area of the LPR system experience the quality drop. Determining 820 may comprise determining the other LPR systems or camera apparatuses within the threshold area of the LPR system experience the quality drop or do not experience the quality drop. In some embodiments, the LPR system 300 receives data from one or more remote entities describing performance metrics of other LPR systems and camera apparatuses within a threshold area. Multiple LPR systems and camera apparatuses within a threshold area experiencing a similar drop in performance may be caused by, for example, weather conditions not captured by historic data or other local environmental factors, while a LPR system 300 experiencing a drop in performance is likely to be caused by more specific factors, e.g., an unclean camera lens or windshield. When the other LPR systems or camera apparatuses within the threshold area of the LPR system do not experience the quality drop, the method may continue. When the other LPR systems or camera apparatuses within the threshold area of the LPR system experience the quality drop, the method may end.

In some embodiments, responsive to all of the above-described criteria being met, the LPR system 300 triggers 850 a warning that one or more entities of the LPR system or camera apparatus may require an action, e.g., cleaning of a windshield, replacement of a camera lens, or the like. In other embodiments, responsive to at least a threshold number of the above-described criteria being met, the LPR system 300 may trigger the warning that one or more entities of the LPR system or camera apparatus may require an action.

In the example method of FIG. 8, the steps are performed by the LPR system 300. In other embodiments, one or more of the steps may be performed in whole or in part by another entity of the LPR system, e.g., by a camera apparatus 201. Additionally, the method may comprise additional, fewer, or different steps, and the steps may be performed in a different order than described in conjunction with FIG. 8.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C.

Any of the steps, operations, or processes described herein may be performed or implemented with one or more hardware or software modules, alone or in combination with other devices. Embodiments may also relate to an apparatus or system for performing the operations herein. Such an apparatus or system may be specially constructed for the required purpose, and/or it may comprise a general-purpose device selectively activated or reconfigured by a computer program stored in the apparatus or system. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Systems, methods, and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

Examples of various exemplary embodiments embodying aspects of the invention are presented in the following example set. It will be appreciated that all the examples contained in this disclosure are given by way of explanation, and not of limitation.

What is claimed is:

1. A method comprising:
    capturing, by a camera device of a license plate recognition ("LPR") system, an image of an environment of the LPR system, the captured image comprising a license plate in the environment;
    applying, by a processor of the LPR system, an image processing algorithm to the captured image, the image processing algorithm configured to output a detected set of characters corresponding to the license plate in the captured image;
    in response to the output of the detected set of characters, applying, by the processor, one or more algorithms to at least one of the captured image or the detected set of characters, the one or more algorithms configured to output information describing performance of the LPR system;
    accessing, by the processor, one or more images and associated output information, the one or more accessed images and the associated output information captured by the camera device of the LPR system at one or more previous times;
    determining, by the processor, one or more trends describing performance of the LPR system during a period corresponding to one or more timestamps of the captured image and the one or more accessed images, the one or more trends distinguishing the performance of the LPR system from one or more environmental conditions from the period;
    based at least in part on the output information describing performance of the LPR system and the one or more trends, determining, by the processor, that one or more entities of the LPR system require one or more actions; and
    transmitting, by the processor, information describing the one or more entities and the one or more required actions.

2. The method of claim 1, wherein the one or more algorithms comprises a direct image analysis algorithm and the output information describing the performance of the LPR system comprises information describing blur in the captured image output by the direct image analysis algorithm.

3. The method of claim 1, wherein the one or more algorithms comprises an OCR confidence algorithm and the output information describing the performance of the LPR system comprises information describing a confidence level of the detected set of characters output by the OCR confidence algorithm.

4. The method of claim 3, wherein determining that the one or more entities of the LPR system require the one or more actions is based on the output information describing the performance of the LPR system of the OCR confidence algorithm being less than a threshold value.

5. The method of claim 1, wherein the one or more entities of the LPR system comprises a windshield of a vehicle associated with the LPR system and further wherein transmitting the information describing the one or more entities and one or more required actions comprises transmitting, to a user device, an instruction to clean the windshield of the vehicle.

6. The method of claim 1, wherein the one or more entities of the LPR system comprises a windshield of a vehicle associated with the LPR system and further wherein transmitting the information describing the one or more entities and the one or more required actions comprises transmitting, via a communication interface of the LPR system communicatively coupled to the vehicle, an instruction to begin an automated windshield cleaning process by the vehicle.

7. The method of claim 1, wherein the one or more entities of the LPR system comprises a camera lens of the camera device of the LPR system and further wherein transmitting the information describing the one or more entities and one or more required actions comprises transmitting, to a user device, an instruction to clean the camera lens of the camera device.

8. The method of claim 1, wherein the one or more accessed images are associated with the one or more environmental conditions corresponding to one or more environmental conditions of the captured image.

9. The method of claim 1, wherein determining that the one or more entities of the LPR system require the one or more actions is based on the performance of the LPR system during the period having dropped more than a threshold amount.

10. The method of claim 1, further comprising:
    receiving, by the processor, one or more received images and corresponding output information, the one or more received images and the corresponding output information captured by one or more other camera devices of one or more other LPR systems; and
    comparing, by the processor, the captured image and the output information describing the performance of the LPR system to the one or more received images and the corresponding output information;
    wherein determining that the one or more entities of the LPR system require the one or more actions is based at least in part on a result of the comparing.

11. The method of claim 1, further comprising:
    responsive to determining that the one or more entities of the LPR system require the one or more actions, modifying, by the processor, one or more parameters of the image processing algorithm.

12. The method of claim 1, further comprising:
    responsive to determining that the one or more entities of the LPR system require the one or more actions, modifying, by the processor, one or more parameters of the camera device.

13. A license plate recognition ("LPR") system comprising:
    a camera device comprising an image sensor, the camera device having a set of parameters and configured to capture images with the image sensor;
    a memory configured to store the captured images output by the image sensor; and a processor communicatively coupled to the memory and camera device, the processor configured to perform steps comprising:

applying an image processing algorithm to a captured image of the captured images, the image processing algorithm configured to output a detected set of characters corresponding to the license plate in the captured image;

in response to the output of the detected set of characters, applying one or more algorithms to at least one of the captured image or the detected set of characters, the one or more algorithms configured to output information describing performance of the LPR system;

accessing, by the processor, one or more images and associated output information, the one or more accessed images and the associated output information captured by the camera device of the LPR system at one or more previous timestamps;

determining, by the processor, one or more trends describing performance of the LPR system during a period corresponding to a timestamp of the captured image and the one or more previous timestamps of the one or more accessed images, the one or more trends distinguishing the performance of the LPR system from one or more environmental conditions;

based at least in part on the output information describing the performance of the LPR system and the one or more determined trends, determining that one or more entities of the LPR system require action; and transmitting information describing the one or more entities.

14. The LPR system of claim 13, wherein the one or more algorithms comprises a direct image analysis algorithm and the output information describing the performance of the LPR system comprises information describing blur in the captured image output by the direct image analysis algorithm.

15. The LPR system of claim 13, wherein the one or more algorithms comprises an OCR confidence algorithm and the output information describing the performance of the LPR system comprises information describing a confidence level of the set of characters output by the OCR confidence algorithm.

16. The LPR system of claim 13, further comprising:
receiving, by the processor, one or more received images and corresponding output information, the one or more received images and the corresponding output information captured by one or more other camera devices of one or more other LPR systems; and comparing, by the processor, the captured image and the output information describing the performance of the LPR system to the one or more received images and the corresponding output information;

wherein determining that the one or more entities of the LPR system require action is based at least in part on a result of the comparing.

17. The LPR system of claim 13, further comprising:
responsive to determining that the one or more entities of the LPR system require action, modifying, by the processor, one or more parameters of the image processing algorithm.

18. The LPR system of claim 13, further comprising:
responsive to determining that the one or more entities of the LPR system require action, modifying, by the processor, one or more parameters of the set of parameters of the camera device.

19. A method comprising:
capturing, by a camera device of a license plate recognition ("LPR") system, an image of an environment of the LPR system, the captured image comprising a license plate in the environment;

applying, by a processor of the LPR system, an image processing algorithm to the captured image, the image processing algorithm configured to output a detected set of characters corresponding to the license plate in the captured image;

in response to the output of the detected set of characters, applying, by the processor, one or more algorithms to at least one of the captured image or the detected set of characters, the one or more algorithms configured to output information describing performance of the LPR system;

receiving, by the processor, one or more images and corresponding output information, the one or more received images and the corresponding output information captured by one or more other camera devices of one or more other LPR systems;

comparing, by the processor, the captured image and the output information to the one or more received images and the corresponding output information;

based at least in part on the output information and a result of the comparing, determining, by the processor, that one or more entities of the LPR system require one or more actions, the result of the comparing comprising performance information associated with the one or more entities and one or more environmental conditions associated with the environment; and transmitting, by the processor, additional information describing the one or more entities and the one or more required actions.

20. The method of claim 19, wherein the one or more algorithms comprises at least one of a direct image analysis algorithm or an OCR confidence algorithm and the output information comprises information output by the at least one of the direct image analysis algorithm or the OCR confidence algorithm.

* * * * *